(12) United States Patent
Glass et al.

(10) Patent No.: US 7,451,459 B2
(45) Date of Patent: Nov. 11, 2008

(54) SYSTEMS, METHODS, AND APPARATUS FOR INDICATING PROCESSOR HIERARCHICAL TOPOLOGY

(75) Inventors: Adam B. Glass, Woodinville, WA (US); Robert B. Nelson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/429,316

(22) Filed: May 5, 2003

(65) Prior Publication Data

US 2004/0226026 A1 Nov. 11, 2004

(51) Int. Cl.
*G06F 9/44* (2006.01)
(52) U.S. Cl. .............................. 719/328; 718/1; 718/100
(58) Field of Classification Search ................. 719/310, 719/328, 320; 707/10, 103 R; 711/152, 711/153, 154; 713/164; 710/72; 715/740, 715/783; 714/47; 718/1, 100, 102, 104
See application file for complete search history.

(56) References Cited

U.S. PATENT DOCUMENTS

| | | | |
|---|---|---|---|
| 4,435,759 A | | 3/1984 | Baum et al. |
| 5,649,135 A | | 7/1997 | Pechanek et al. |
| 5,682,491 A | | 10/1997 | Pechanek et al. |
| 5,915,131 A | * | 6/1999 | Knight et al. .................. 710/72 |
| 6,038,625 A | * | 3/2000 | Ogino et al. ................. 710/104 |
| 6,128,720 A | | 10/2000 | Pechanek et al. |
| 6,298,354 B1 | * | 10/2001 | Saulpaugh et al. ...... 707/103 R |
| 6,381,682 B2 | * | 4/2002 | Noel et al. .................... 711/153 |
| 6,542,899 B1 | * | 4/2003 | Saulpaugh et al. ...... 707/103 R |
| 6,581,115 B1 | | 6/2003 | Arimilli et al. |
| 6,801,224 B1 | * | 10/2004 | Lewallen ...................... 715/746 |
| 6,832,266 B1 | * | 12/2004 | Shaylor ........................ 719/328 |
| 6,854,123 B1 | * | 2/2005 | Lewallen ...................... 719/328 |
| 6,920,581 B2 | * | 7/2005 | Bigbee et al. .................. 714/10 |
| 6,961,944 B2 | * | 11/2005 | Chew et al. .................. 719/328 |
| 6,990,579 B1 | * | 1/2006 | Herbert et al. ............... 713/164 |
| 7,069,395 B2 | * | 6/2006 | Camacho et al. ............. 711/152 |
| 7,158,974 B2 | * | 1/2007 | Williams et al. .............. 707/10 |

OTHER PUBLICATIONS

Dobson "Topology API", version: 0.4, Oct. 25, 2002, pp. 1-4.*
Deborah T. Marr, Frank Binns, David L. Hill, Glenn Hinton, David A. Koufaty, J. Alan Miller, and Michael Upton. Hyper-Threading Technology Architecture and Microarchitecture. Intel Technology Journal. vol. 6 Issue 01, Feb. 2002, pp. 4-15.

* cited by examiner

*Primary Examiner*—Van H Nguyen
(74) *Attorney, Agent, or Firm*—Amin, Turocy & Calvin, LLP

(57) ABSTRACT

The present invention utilizes a topology application programming interface (API) to provide relation information describing processor and platform topology to an executable program via a standardized interface. By providing topology information, the topology API allows the program to optimize its performance based upon the information without having to be explicitly aware of the actual platform architecture. The present invention also provides an expandable topology API that allows for future expansion of information type, without altering the standardized interface. In another instance of the present invention, the topology API collects, processes, and provides topology information about an underlying hardware architecture.

30 Claims, 18 Drawing Sheets

| Affinity Mask | Relation | Meta Information |
|---|---|---|
| 00000001 | Cache | 8K Level 1 Cache, 8 way assoc |
| 00000010 | Cache | 8K Level 1 Cache, 8 way assoc |
| 00000100 | Cache | 16K Level 1 Cache, 4 way assoc |
| 00001000 | Cache | 16K Level 1 Cache, 4 way assoc |
| 00010000 | Cache | 8K Level 1 Cache |
| 00100000 | Cache | 8K Level 1 Cache |
| 01000000 | Cache | 8K Level 1 Cache |
| 10000000 | Cache | 8K Level 1 Cache |
| 00000011 | Processor Core | Specified logical processors share functional units |
| 00001100 | Processor Core | Specified logical processors share functional units |
| 00110000 | Processor Core | Specified logical processors share functional units |
| 11000000 | Processor Core | Specified logical processors share functional units |
| 11110000 | NUMA | NUMA node 0 |
| 00001111 | NUMA | NUMA node 1 |
| 101001010 | ...<some future relation> | ..... |

FIG. 11

SYSTEMS, METHODS, AND APPARATUS FOR INDICATING PROCESSOR HIERARCHICAL TOPOLOGY

TECHNICAL FIELD

The present invention relates generally to processor and platform topology, and more particularly to apparatus, systems and methods for indicating processor and platform topology to software program applications in a computing environment.

BACKGROUND OF THE INVENTION

Computers have become an essential part of our everyday lives. They have the capability to process information quickly and accurately. Because of this, society has embraced utilizing computers for critical needs such as banking, space flight, medical, and air traffic control and the like. Thus, a computer's speed and accuracy are paramount in these types of critical transactions. These characteristics have also been embraced, however, by people expecting the same great performance from computers in non-critical applications such as for large information storage and retrieval systems. Thus, programs, such as database programs and the like, that execute high numbers of transactions per second also require high performance computing systems. These extreme demands on computing systems have driven great gains in the area of computing performance.

A computing system is generally composed of hardware and software components that interact with each other. The hardware components can be described generally as those parts of the computing system that a person can physically touch. These include processors, memory chips, hard drives, connecting wires and traces, and other supporting hardware devices. Typically, the processing hardware components are constructed so that they can recognize two logical states, namely a "0" state (or low electrical state) and a "1" state (or high electrical state). Employing a number of these states together in a sequence allows data to be stored and processed by the hardware. The software components contain instruction sets that utilize the hardware to accomplish a particular task. They are typically written in "code" that is a high level software language for representing the desired zeroes and ones (or "low" and "high" states). In this manner, software can be written to accurately control the hardware components to return a desired effect.

As can be expected as technology progresses, the lines between what is hardware and what is software tends to blur a little. Thus, the concept of "firmware" arises where the name indicates that it is not quite hardware but also not quite software. Generally speaking, firmware is ones and zeroes that reside in somewhat of a permanent state on a hardware component to allow control of the hardware at a low level or "root" level. It is considered "firm" because it does not change often and is utilized for a particular type of hardware component or platform. Firmware typically handles hardware specific interfaces and the startup sequences of the hardware components.

When computing systems were first developed, it was desirable to have some common software that could handle reading and writing to hard drives and some basic repetitive tasks necessary to operate the computing system. These included diagnostics, data file structures, and human-machine interfaces. A disk operating system was developed initially to handle file structures and basic interfaces. This progressed into what is known today as an "operating system." Gone are text based user-interfaces and now graphical user interfaces ("GUI") are considered the norm. Thus, the disk operating system has developed into a full blown, user-oriented operating system that provides a greater amount of flexibility, ease of use, and control over a computing system than was previously achievable.

With fast hardware and an easy to use operating system, all that is needed is a way to get the computing system to behave in a way that gives a desired result. This could be achieved by continuously altering an operating system. However, people typically have different tasks that they want a computing system to perform. So, the operating system remains "common" software and additional task specific software is written to perform those specific tasks, called "application" software (or executable software). For example, if a user wants to balance their checkbook, they can install financial application software on their computing system and perform that task. Thus, having application software allows the computing system to expand its tasking capabilities without changing its hardware components and/or operating system. Utilizing this type of hardware and software architectural structure allows almost infinite task capability for a given computing system.

The typical limitations on a computing systems task capability can be generally characterized by its speed. How much and how fast a computing system can handle information usually indicates the limits of what the system is capable of achieving. Therefore, increasing the performance of a computing system allows it to be more flexible and to do more work. This can be accomplished in any one of the architectural levels of a computing system. Thus, strides have been made in optimizing hardware components and also software components for speed. As competing hardware manufacturers have introduced new and different hardware architectures for increased performance, often times operating systems and even applications must change also to utilize those changes before performance gains can be realized.

One of the first areas of hardware performance gains was in introducing a data "cache". This allowed frequently used data to be available quickly to hardware processing components, increasing their speed. Eventually, multi-leveled caches were developed and some even placed on a semiconductor die ("onboard" cache) along with the processor to achieve even faster response times. Along with optimizing frequently used data retrieval, manufacturers also worked on increasing the processing speed itself. Processor semiconductor chips were shrunk dramatically in size and new materials were used to get even smaller sized chips. This allowed extremely fast state (zeroes and ones) changes within the processors. Today, processor speeds have reached beyond 3 gigahertz levels with front side bus speeds well over 500 megahertz. Increasing the bus (or "connection") speed allows the processors to access "offboard" cache faster, facilitating the processor speed.

Typically, increasing a processor's speed may not require extensive changes to an operating system nor to applications that run on a computing system. These types of changes are generally "overall" performance increases that mean faster processing even with unchanged software. Unfortunately, there are physical limitations to this type of performance increase. Semiconductor sizes are nearing atomic levels where eventually it will not be possible to go any smaller. This has created a push in architectural optimization to increase processing in a computing system. Hardware manufacturers have begun to develop computing platforms (systems) with multiple processors instead of just a single processor. They have also introduced single physical packages that contain multiple processing cores in what used to be only a single processor core. Additionally, recent trends have produced processors with multiple "logical" processors that are utilized, for example, in simultaneous multi-threading. These logical processors are not physical processors, but appear as such from a user's perspective. They typically share functional resources such as adders and memory and the like. Caches have begun to be shared between both physical and logical processors. Buses have also been utilized as shared resources for performance gains. Thus, the hardware components in a computing system have grown quite complex in their architecture and can vary greatly with each computing platform.

This newer breed of enhanced platform optimization requires changes in software to fully realize the platform's potential. The reason for this is the introduction of multiple processing entities, whether they are physical and/or logical entities. A software application can often increase its performance by utilizing more than one processing entity. This is not always the case because it requires that an application have internal processes that do not require a serial process (i.e., one action must always precede another action in sequence) in order to allow multiple processes to execute at the same time. An application must also be aware that it has access to a platform with multiple processing entities. It must also have its code written so that it can optimize itself based upon a particular processing architecture. Obviously, this requires changes to the software application before a user will obtain increased performance.

Independent software vendors (ISVs) who write applications typically license their applications. Many determine whether a license is being "used" based on how many processors it executes on. With the introduction of multiple processors, multiple cores, and multiple logical processors, this task becomes quite complex. Each computing platform could conceivably have a different architecture. So, regardless of whether for licensing and/or for performance gains, an ISV must orientate their software application for all possible combinations of architectures found on platforms that they hope their software will operate on. In addition, they must research the architecture, test and execute their code on all of those platforms, sometimes a very daunting task.

Because of the constant need to increase computing system speeds, it is very likely that performance strides will continue to be made. Therefore, it is unlikely that only existing hardware architectures utilized today will be the only ones used in the future. Thus, it is more likely that even higher complexity architectures will be developed with even more varying combinations. This will also drive to increase the complexity of the software applications in order for them to adequately exploit the hardware architecture to fully optimize their application's performance. However, to remain competitive, ISVs must keep pace with the hardware architecture changes to optimize their application's performance or risk losing market share for their products.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to processor and platform topology, and more particularly to apparatus, systems and methods for indicating processor and platform topology to software program applications in a computing environment. A topology application programming interface (API) is leveraged to provide relation information describing processor and platform topology to an executable program. By providing topology information, the topology API allows the program to optimize its performance based upon the information without having to be explicitly aware of the actual platform architecture, easily enhancing application performance for a multitude of hardware architectures. The present invention also allows for executable programs to receive the information via a standardized interface that remains common regardless of the type of hardware platform architecture, permitting ISVs to concentrate on development of their task at hand rather than spending time learning new platform architectures, saving time and money.

The present invention also facilitates platform and processor usage by allowing complex architectures to be easily assimilated by executable programs. This permits more advanced architectures to be developed without being concerned that ISVs will not be able to fully optimize the architecture due to its complexity. The topology API provides topology information required to optimize the executable program without an ISV having to learn a new specific architecture. This reduces costs and time associated with development of an executable program, both in reducing its interface complexity and also in reducing the types of experts required for its code development. The present invention also provides an expandable topology API that allows for future expansion of information type, without altering the standardized interface. In this fashion, the present invention can expand its flexibility and does not require an ISV to relearn a new interface. This flexibility drastically decreases the development time of an executable program and, at the same time, enables interactivity with any hardware platform, allowing an ISV to quickly code an executable program and optimize its performance as necessary, maximizing its speed and providing a reliable, highly stable executable program.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 11 is a table of a hardware topology component data structure in accordance with an aspect of the present invention.

DETAILED DESCRIPTION OF THE INVENTION

Figure 1:
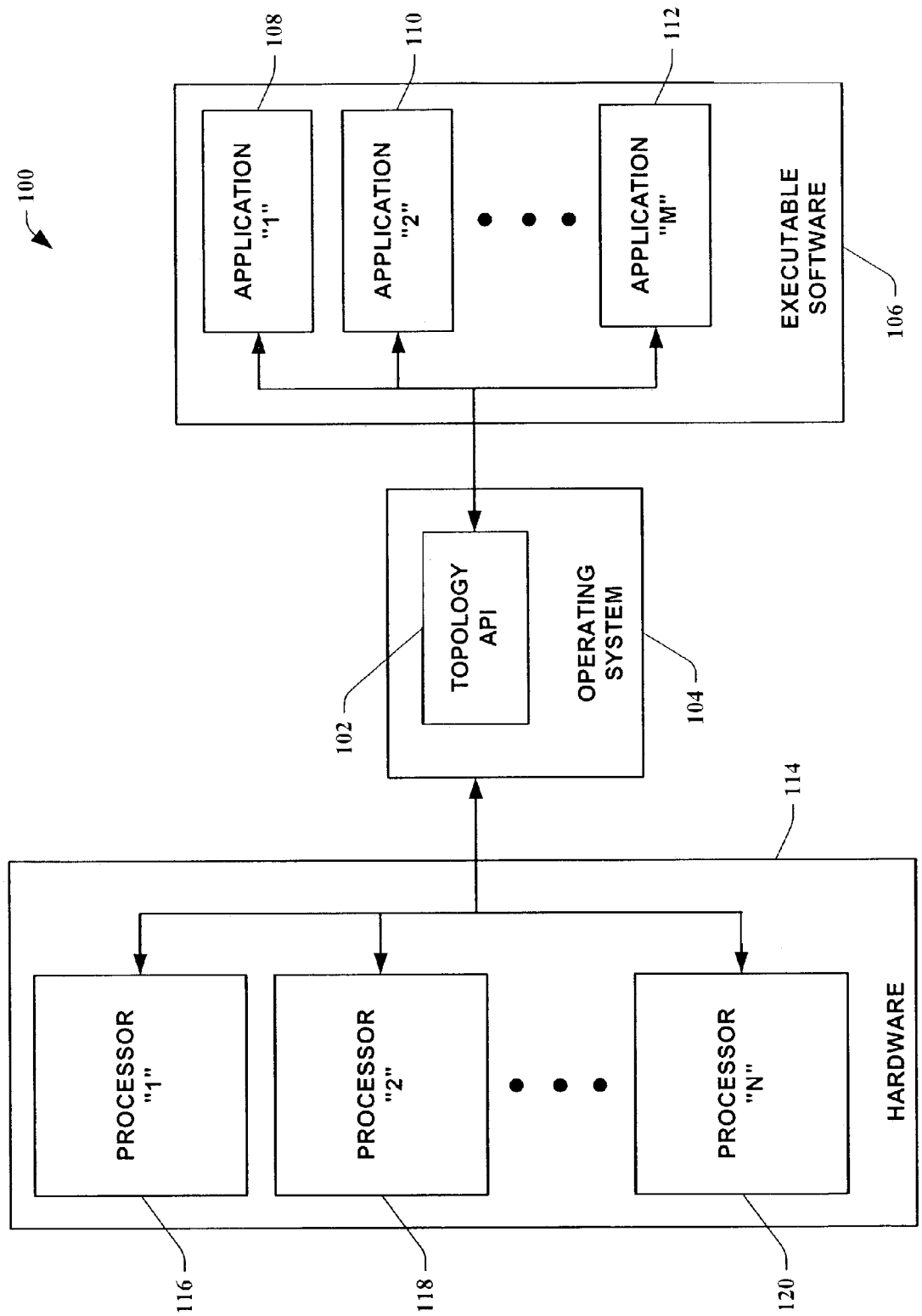
FIG. 1 is a block diagram of a hardware topology system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides a simple mechanism to describe a variety of logical processor properties and relationships between logical processors. A logical processor is generally defined as a software code-executing entity with its own unique state (e.g., own registers). Traditional information mechanisms require separate API specification and documentation to relate various logical processor properties and relationships. The present invention provides a common, expandable API for providing a variety of logical processor information. This mechanism can be used, for example, to describe per logical processor cache information, symmetric multi-threading (SMT) relations, multi-core processors, shared package caches, non-uniform memory access (NUMA) node membership, platform caches, and processor bus information and the like utilizing a single interface. The present invention communicates a variety of information about logical processors and various relationships between logical processors via a descriptive but expandable means.

In one aspect of the present invention, this means is accomplished by employing a single API that returns a series of records. The records are organized with three components including a logical affinity mask for representing each logical processor, a relation value indicating the type of property and its relationship described in the record and meta data specific to the property and relationship. Each logical processor in a computing system is represented in the affinity mask by a single bit. Thus, the mask can make the record refer to one or more logical processors within the computing system. The relation value indicates a type of relationship between logical processors specified in the affinity mask. The relation values and meta data may be expanded without modification to the API. This allows for describing various processor properties and relations in a concise manner without mandating the specification, development, and documentation of a new API for each additional bit of functionality. The information provided by the API allows applications easy access to processor and platform information that they can utilize to optimize their applications and/or implement licensing policy. In another instance of the present invention, an operating system kernel creates and returns these records upon request by an application. In still other instances of the present invention, the API can provide a description of per logical processor caches, multi-core processor relationships, multi-core shared processor caches, and/or platform caches and the like.

Referring to FIG. 1, a block diagram of a hardware topology system 100 in accordance with an aspect of the present invention is shown. A topology API 102 operates within an operating system 104 on a computing system. The topology API 102 interfaces with executable software 106. In this instance of the present invention, the executable software 106 is comprised of application "1" 108, application "2" 110, and application "M" 112 which represents a series of applications from 1 to "M", where M is any integer from one to infinity. Thus, the topology API 102 can be invoked by any number of executable programs or applications. In this particular instance of the present invention, the operating system 104 interfaces with hardware components 114 of the computing system. In other instances of the present invention, the topology API 102 can interface directly with the hardware components 114. The hardware components include such components as a platform, cache, processors, and buses and the like of a computing system. FIG. 1 only illustrates a series of processors, but the present invention is not limited to only interfacing with processors. The hardware components 114 in this example are comprised of processor "1" 116, processor "2" 118, and processor "N" 120 which represents a series of processors from 1 to "N", where N is any integer from one to infinity. In general, however, a typical operating system has a bounded processor handling capability that would limit the total number of processors. In still other instances of the present invention, the processor range is zero to infinity, allowing for circumstances where no processors are available for use by an application.

Thus, the operating system 104 and/or the topology API 102 can interface with any number of hardware components. In this instance of the present invention, the operating system 104 collects topology data from the hardware components 114 and generates topology information about the topology data. Data about data is generally referred to as meta data and, thus, the topology information is meta data generated from the topology data. When the topology API 102 is invoked by a component of the executable software 106, it provides the topology information to an application (executable software program) via a standardized interface. This allows applications to be "hardware topology aware" and to optimize their execution based on the topology of the underlying hardware. And the topology API 102 allows developers to spend more time developing their task code than researching how to extract topology data from a multitude of hardware component combinations.

Figure 2:
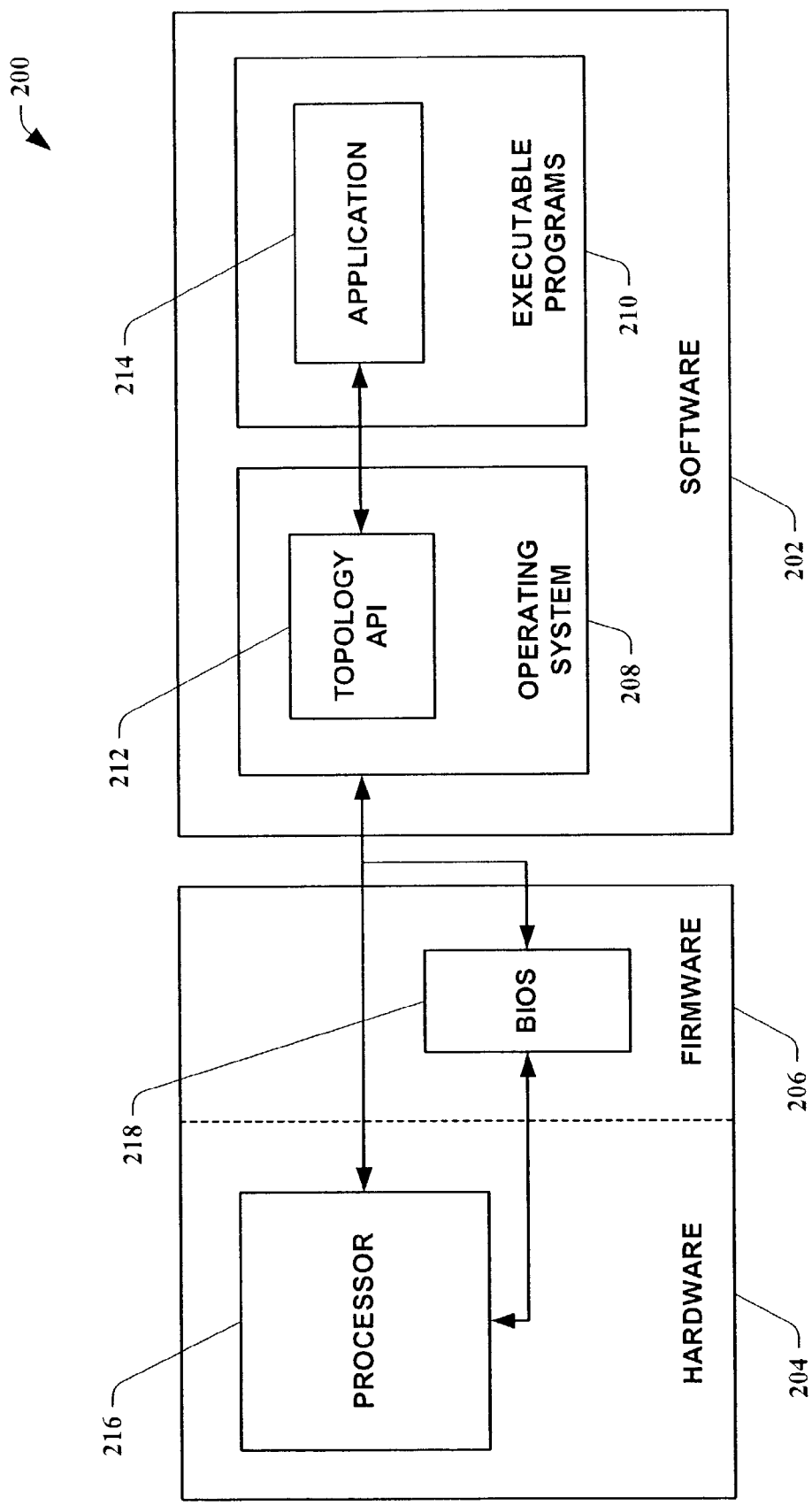
FIG. 2 is a block diagram of a hardware topology system environment in accordance with an aspect of the present invention.

Turning to FIG. 2, a block diagram of a hardware topology system environment 200 in accordance with an aspect of the present invention is illustrated. The environment 200 is comprised of a hardware component 204, a firmware component 206, and a software component 202. The software component 202 is comprised of an operating system 208 and executable programs 210. A topology API 212 operates within the operating system 208. The executable programs, in this instance, are comprised of an application 214. The topology API 212 interfaces with the application 214. In this manner, the application 214 can invoke the topology API 212 in order to retrieve topology information via a "call" or code line invoking the topology API 212. The hardware component 204 is comprised of a processor 216. Typically, the processor 216 will also have processor cache and a system bus associated with it (not illustrated). The firmware 206 is comprised of low level platform software and is often represented by "BIOS" 218 or basic input/output software. This low level code typically starts the processors and handles any hardware specifics to a particular platform. That is, a typical BIOS is platform specific and facilitates in allowing a more common hardware interface to higher level code such as an operating system. Once the processor 216 is up and running, the operating system 208 can then utilize the processor 216. There are still some types of information that the BIOS 218 can provide and, therefore, the operating system 208 typically continues to interface with the BIOS when that information is required.

In this instance of the present invention, the topology API 212 is invoked by the application 214 via a standardized interface. The topology API 212 obtains topology information from the operating system 208 and provides it to the application 214 in a format easily discerned by the application 214. Although, in this instance of the present invention, the operating system 208 interrogates the hardware component 204 and the firmware component 206 and generates topology information, in other instances of the present invention, the topology API 212 handles some or all of this functionality as well (see infra). In still other instances of the present invention, the topology information can be obtained prior to the topology API 212 being invoked. For example, the information can be gathered at system startup and the like.

Figure 3:
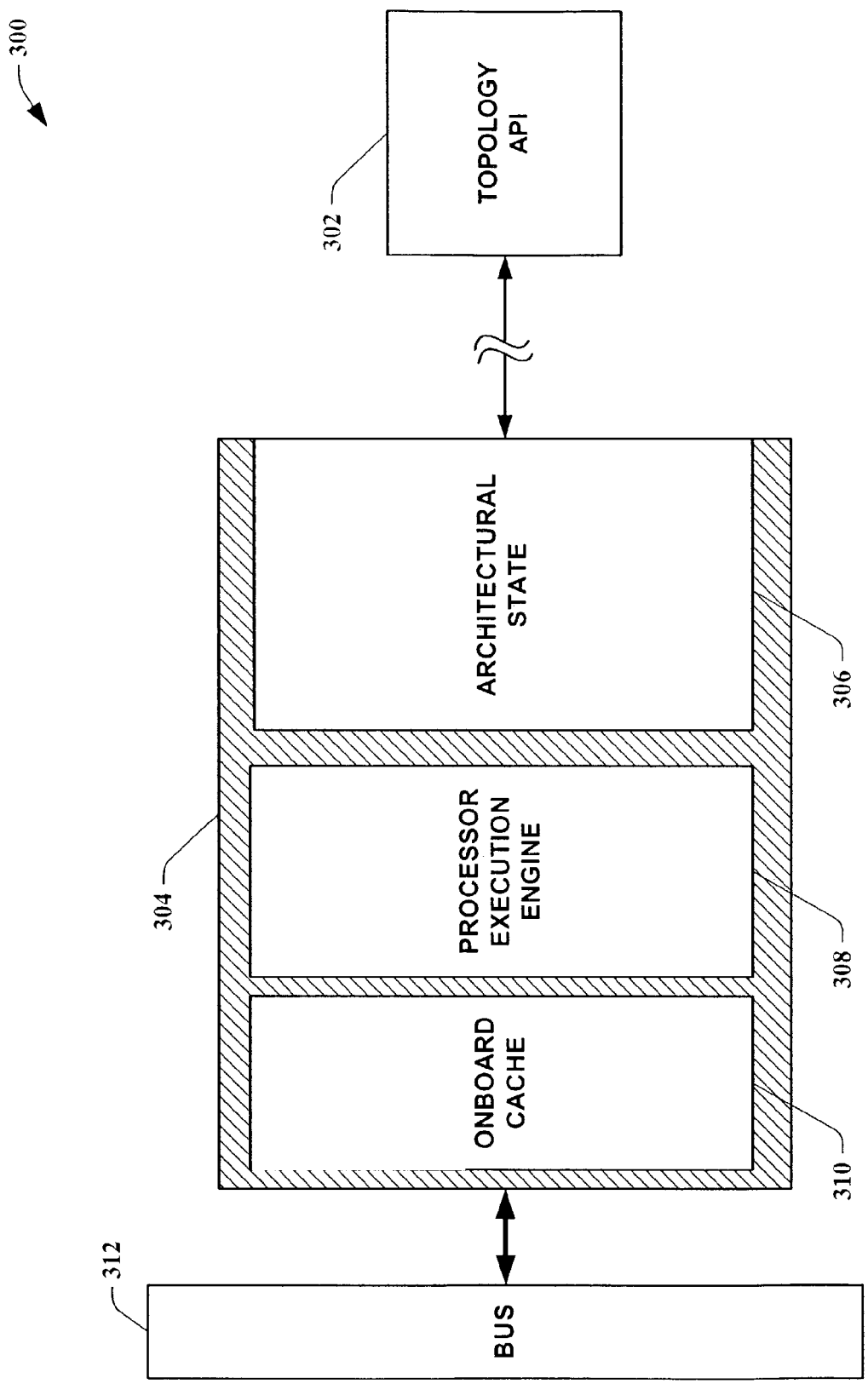
FIG. 3 is a block diagram of a hardware topology system processor interface in accordance with an aspect of the present invention.

The present invention has a capability to provide topology information about various types of hardware configurations and platforms. Turning to FIG. 3, a block diagram of a hardware topology system processor interface 300 in accordance with an aspect of the present invention is depicted. In this example, the interface 300 is comprised of a topology API 302 linked directly or indirectly to a processor 304. The processor 304 is a single core processor comprised of an architectural state 306, a processor execution engine 308, and onboard cache 310. The processor 304 is also connected to a bus 312 and can additionally be connected to offboard cache (not shown). FIG. 3 depicts a typical processor in that it has only one architectural state 306, one execution engine 308 and one onboard cache 310. In this instance of the present invention, the topology API 302 receives information that the processor 304 is a single core processor with a single architectural state 306 with no shared resources. This type of hardware configuration has been the standard for computing systems for many years. However, the architectural structures of hardware components and platforms have increased in complexity as illustrated infra. In this particular example, the topology API 302 provides the topology information to an application when the topology API 302 is invoked. Under these circumstances, the application will most likely execute in a default or standard mode. This is due to the fact that the application is running on a single core processor, and the application's performance is mainly garnered by the single thread processing speed of the processor 304.

Figure 4:
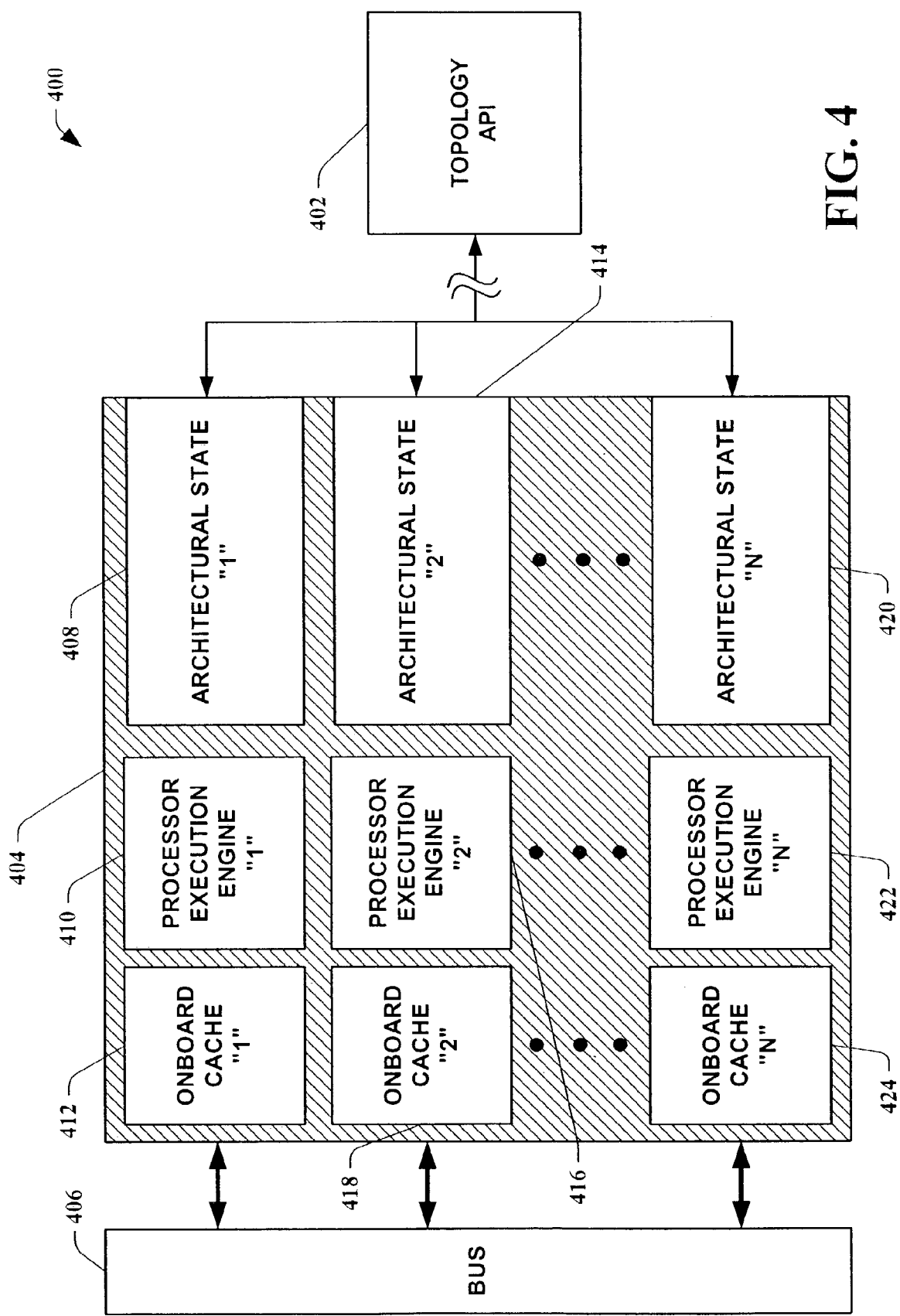
FIG. 4 is a block diagram of a hardware topology system multi-core processor interface in accordance with an aspect of the present invention.

Hence, it is possible to provide hardware components and platforms that can enable an application to achieve much higher performance than that achieved by utilizing single core processors. Referring to FIG. 4, a block diagram of a hardware topology system multi-core processor interface 400 in accordance with an aspect of the present invention is shown. The interface 400 is comprised of a topology API 402 linked directly or indirectly to a multi-core processor 404. The processor 404 is comprised of multiple architectural states 408, 414, 420, multiple processor execution engines 410, 416, 422, and multiple onboard caches 412, 418, 424. The processor 404 is also connected to a bus 406 and can additionally be connected to offboard caches (not shown). The processor 404 can also be connected to multiple buses. In this instance of the present invention, each "core" of the processor 404 is comprised of an architectural state, a processor execution engine, and an onboard cache. It can be appreciated that each core can be comprised of more or less components than those illustrated in FIG. 4, such as no onboard cache, shared caches, or multiple caches and the like. In this example, components of a single core of the processor 404 are represented by the like numbering such as architectural state "1" 408, processor execution engine "1" 410, and onboard cache "1" 412. Grouped together, these elements comprise a first core. Likewise, architectural state "2" 414, processor execution engine "2" 416, and onboard cache "2" 418 represent a second core. And, architectural state "N" 420, processor execution engine "N" 422, and onboard cache "N" 424 represent an Nth core, where N represents the total number of cores and can be any integer from one to infinity. Thus, theoretically, there can be any number of cores within a processor. However, practically speaking, the number of cores is limited by the technology available to manufacture such miniature devices.

The processor 404 is actually "N" processors that have been manufactured on a single die. Therefore, although the processor 404 may look like a single processor in a physical sense, it is actually "N" complete and separate processors. When the topology API 402 is invoked by an application in this instance of the present invention, the topology API 402 provides the application with topology information indicating that the processor 404 is a multi-core processor. This allows the application to adjust accordingly to optimize its required processing. Since the processor 404 contains multiple complete processors, the application can run simultaneous threads to substantially increase its performance. This is due to the fact that each core has a separate execution engine. The only shared resource in this example may be the power supplied to the single physical hardware package. It is also conceivable that the cores can be comprised of separate architectural states and execution engines, but share a single onboard cache. Alternatively, the cores can have no onboard cache.

Figure 5:
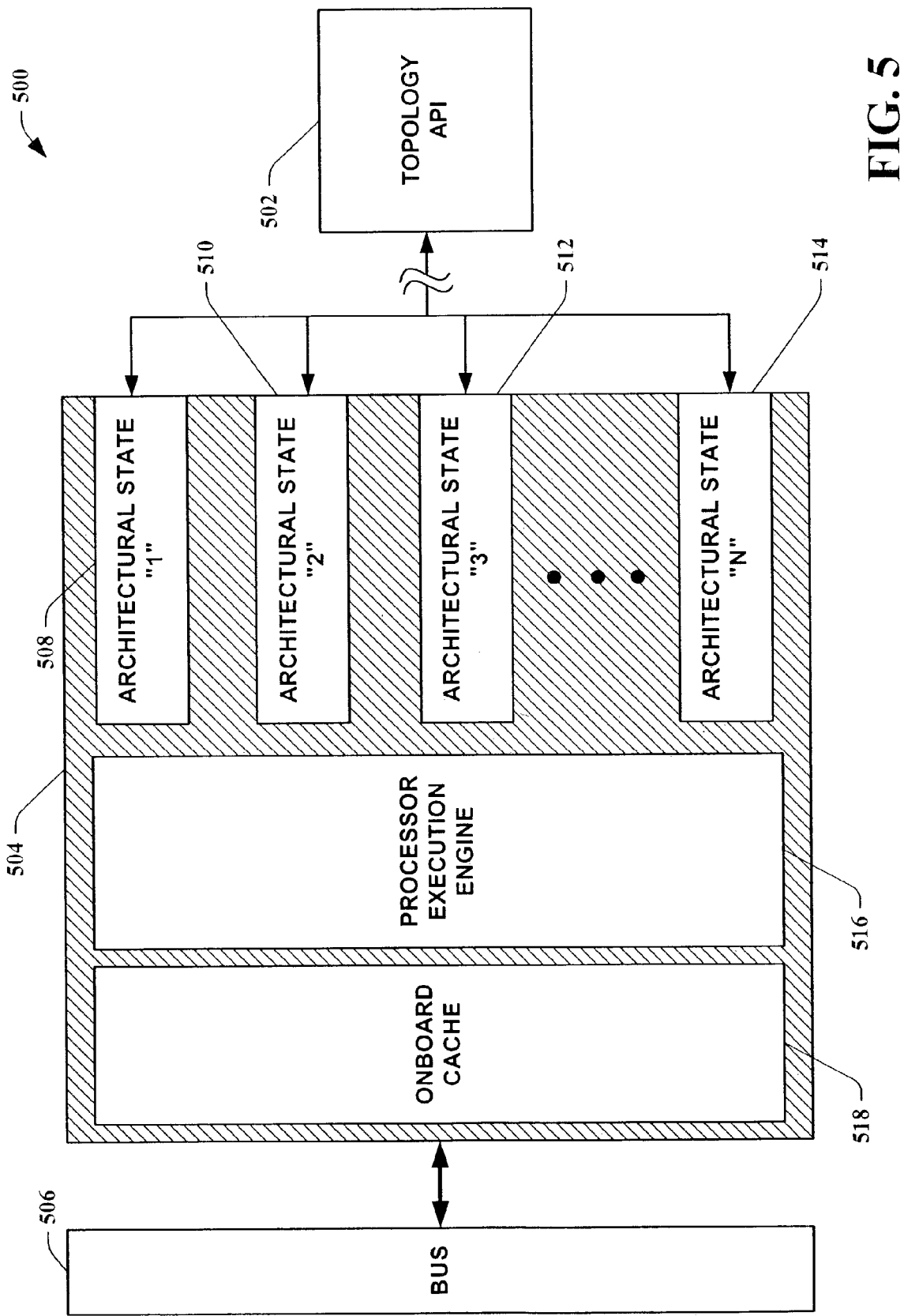
FIG. 5 is a block diagram of a hardware topology system multi-logic processor interface in accordance with an aspect of the present invention.

Multi-core processors can be very expensive to manufacture due to the miniscule scale of the manufacturing technology required to produce complete cores on a single die. As an alternative, other "hybrid" or "partial" core devices have been developed. In FIG. 5, a block diagram of a hardware topology system multi-logic processor interface 500 in accordance with an aspect of the present invention is depicted. The interface 500 is comprised of a topology API 502 linked directly or indirectly to a multi-logic processor 504. The processor 504 is comprised of multiple architectural states 508-514, a single processor execution engine 516, and a single onboard cache 518. The processor 504 is also connected to a bus 506 and can additionally be connected to offboard caches (not shown). The processor 504 can also be connected to multiple buses. In this instance of the present invention, each "logical processor" of the processor 504 is comprised of an architectural state, a shared processor execution engine, and a shared onboard cache. It can be appreciated that each logical processor can be comprised of more or less components than those illustrated in FIG. 5, such as no onboard cache or multiple caches and the like. In this illustration example, each logical processor shares the same prosecution engine 516 and the same cache 518. The number of logical processors in FIG. 5 can be represented by architecture state "1" 508, architecture state "2" 510, architecture state "3" 512, and architecture state "N" 514, where N represents the total number of architectural states and can be any integer from one to infinity. Thus, theoretically speaking, there can be any number of logical processors within a physical processor component.

From an application's standpoint, this type of processor appears as multiple separate processors. However, it should be noted that each logical processor must share resources utilized by every other logical processor. Therefore, this type of hybrid processor generally does not produce as high a performance gain as a multi-core processor. When the topology API 502 is invoked by an application in this instance of the present invention, the topology API 502 provides the application with topology information indicating that the processor 504 is a multi-logic processor. This allows the application to adjust accordingly to optimize its required processing. Since the processor 504 contains multiple logical processors, the application can run simultaneous threads to substantially increase its performance. However, unlike with a multi-core processor, performance is not optimized if the threads require the same shared resources at the same time. Care must be taken to optimize the threads such that they run at times when the other threads are not utilizing the same shared resources. In this manner, application performance can be enhanced. This is due to the fact that each logical processor shares a single execution engine and typically a single cache. It is also conceivable that the processor may have no onboard cache and, thus, the logical processors share an outboard cache along with a shared bus. Thus, the topology information gained from the present invention is vital in optimizing the application.

Figure 6:
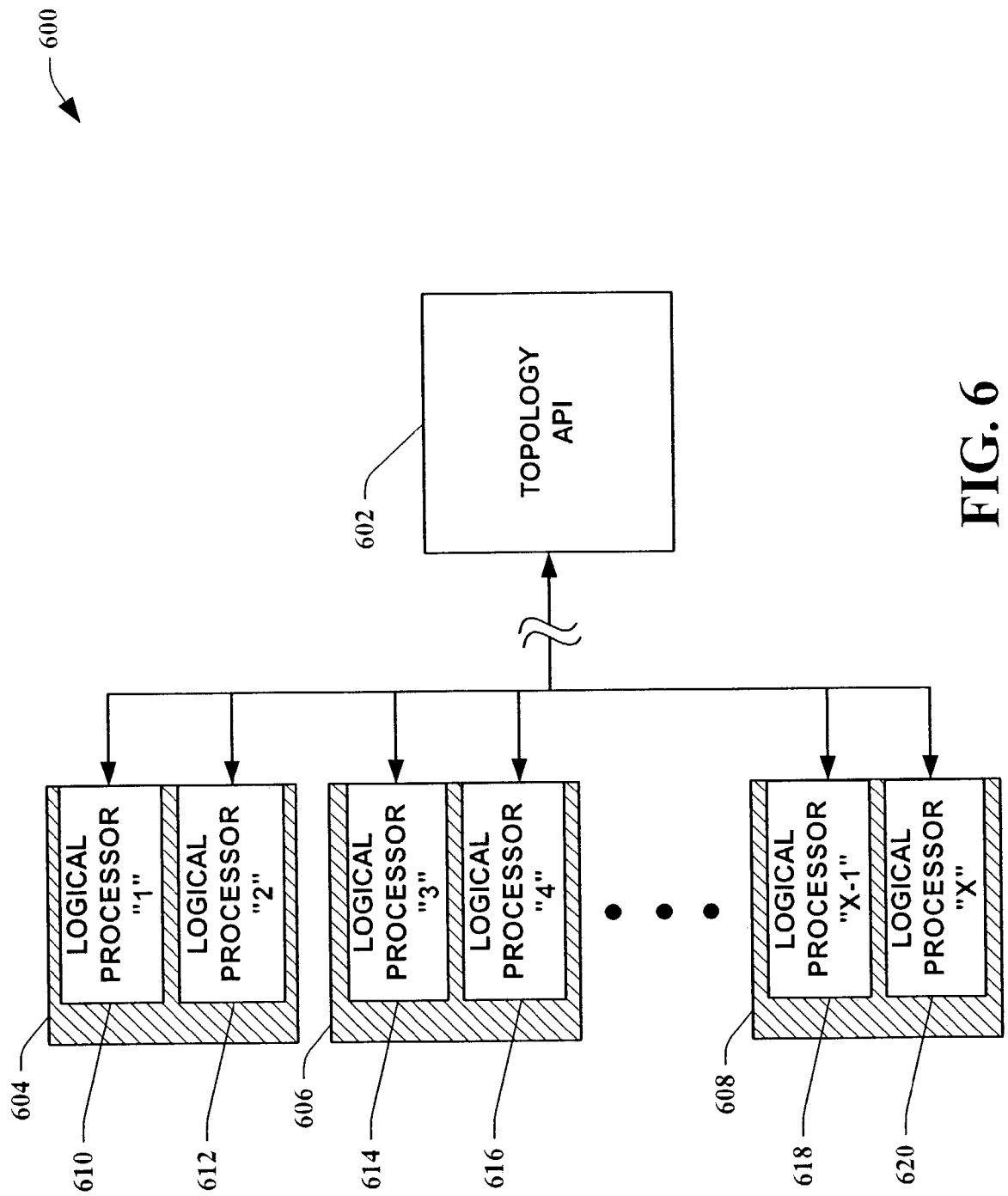
FIG. 6 is another block diagram of a hardware topology system multi-logic processor interface in accordance with an aspect of the present invention.

Obviously, it would be beneficial performance wise to utilize more than one of any type of processor in a computing system platform. Thus, a hardware topology can quickly become even more complex. Turning to FIG. 6, another block diagram of a hardware topology system multi-logic processor interface 600 in accordance with an aspect of the present invention is illustrated. The interface 600 is comprised of a topology API 602, a first multi-logic physical processor 604, a second multi-logic physical processor 606, and an "Nth" multi-logic physical processor 608, where N represents the total number of physical processors and can be any integer from one to infinity. Thus, theoretically any number of physically distinct processors can be represented by the interface 600.

The first multi-logic physical processor 604 is comprised of logical processor "1" 610 and logical processor "2" 612. The second multi-logic physical processor 606 is comprised of logical processor "3" 614 and logical processor "4" 616. The Nth multi-logic physical processor 608 is comprised of logical processor "X-1" 618 and logical processor "X" 620, where X represents the total number of logical processors and can be any integer from one to infinity. FIG. 6 illustrates an example where the topology API 602 interfaces directly or indirectly with multiple physical processors, each having multiple logical processors. Although for this example each physical processor is shown with only two logical processors, it can be appreciated that each physical processor could have, theoretically, unlimited logical processors. In this instance of the present invention, the logical processors are ordered starting with the logical processors 610, 612 on the first multi-logic physical processor 604. This numbering then continues in order with the logical processors 614, 616 on the second multi-logic physical processor 606. The numbering continues in this fashion until the logical processors 618, 620 of the Nth multi-logic physical processor are ordered. Thus, the logical processors are numbered, essentially, in sequence beginning with the first multi-logic physical processor to the last multi-logic physical processor.

This type of ordering system may seem perfectly logical at first glance, but it is generally not considered to be the most efficient use of processing resources. This is due to the way applications typically attempt to utilize processors. For example, an application can send a processing thread #1 to logical processor "1" 610 and a thread #2 to logical processor "2" 612. This means that the first multi-logic physical processor 604 is processing both threads at the same time and utilizing the same resources. In this scenario, greater performance gains would be realized if the application sent thread #1 to logical processor "1" 610 and thread #2 to logical processor "3" 614. This allows the threads to be processed by separate physical processors and no resources are shared between the threads. Thus, it is important to applications to not only know how many logical processors are available, but also how they relate to the physical processors and shared resources. Therefore, when the topology API 602 is invoked by an application, topology information is provided to the application, so the application can adjust its processing needs accordingly to optimize performance.

Figure 7:
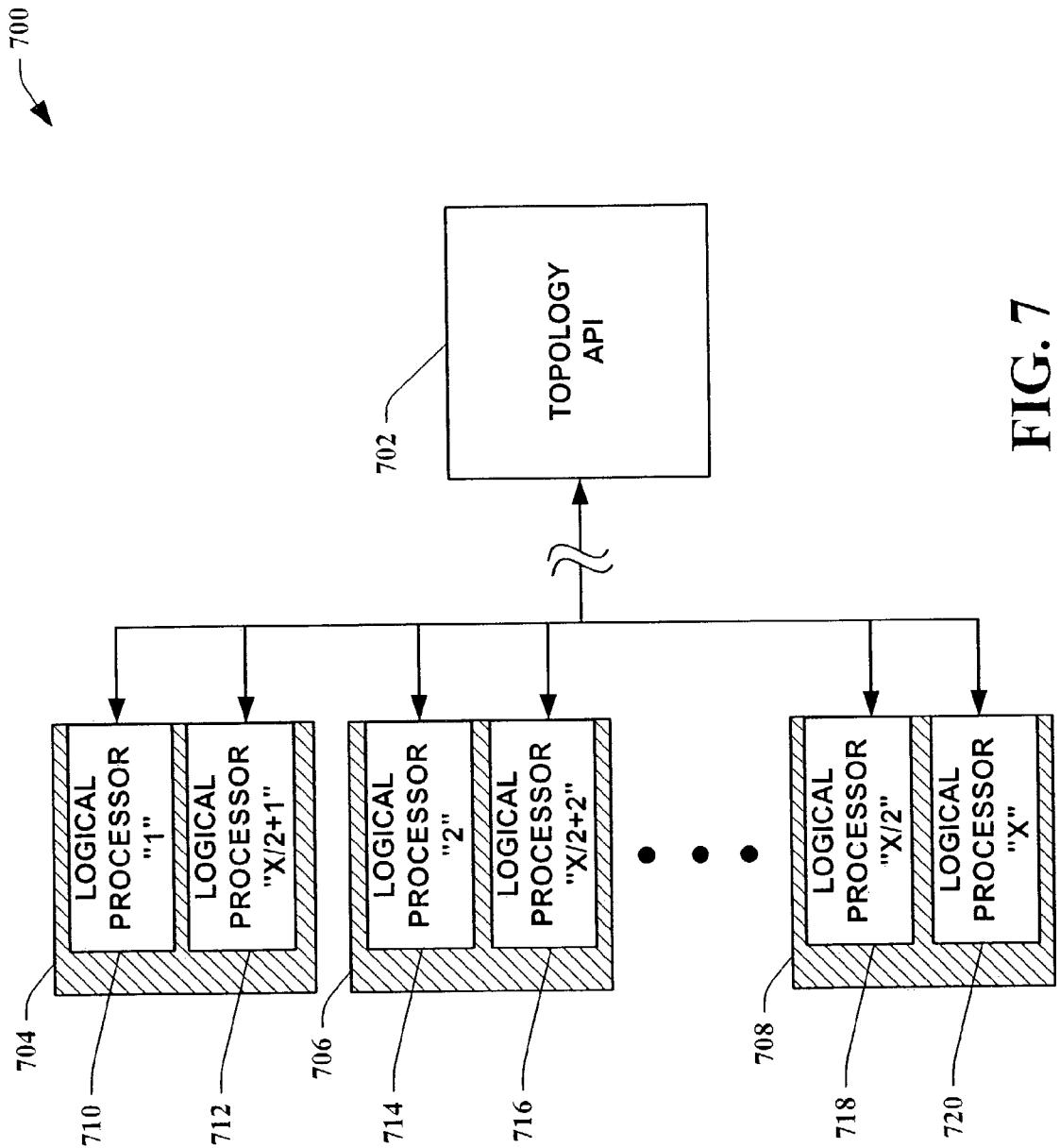
FIG. 7 is yet another block diagram of a hardware topology system multi-logic processor interface in accordance with an aspect of the present invention.

Until higher complexity architectures become standard for computing systems, alternative approaches to configuring logical processors generally facilitate better performance without relaying the complexity of the underlying hardware architecture to the applications. In FIG. 7, yet another block diagram of a hardware topology system multi-logic processor interface 700 in accordance with an aspect of the present invention is shown. The interface 700 is comprised of a topology API 702, a first multi-logic physical processor 704, a second multi-logic physical processor 706, and an "Nth" multi-logic physical processor 708, where N represents the total number of physical processors and can be any integer from one to infinity. Thus, theoretically any number of physically distinct processors can be represented by the interface 700.

The first multi-logic physical processor 704 is comprised of logical processor "1" 710 and logical processor "X/2+1" 712, where X represents the total number of logical processors and can be any integer from one to infinity. Therefore, "X/2" represents the total number of logical processors divided by two. The significance of the divisor is strictly related to this example which utilizes two logical processors per physical processor. The second multi-logic physical processor 706 is comprised of logical processor "2" 714 and logical processor "X/2+2" 716. The Nth multi-logic physical processor 708 is comprised of logical processor "X/2" 718 and logical processor "X" 720. FIG. 7 illustrates another example, similar to FIG. 6, where the topology API 702 interfaces directly or indirectly with multiple physical processors, each having multiple logical processors. Even though for this example each physical processor is shown with only two logical processors, it can be appreciated that each physical processor could have, theoretically, unlimited processors.

In this instance of the present invention, the logical processors are ordered starting with the logical processor "1" 710 on the first multi-logic physical processor 704 and then moving to logical processor "2" 714 on the second multi-logic physical processor 706. This numbering then continues in order until the first processor of each multi-logic physical processor has been numbered. In this example, the Nth multi-logic physical processor 708 has its first logical processor numbered as logical processor "X/2". At this point, the numbering goes back to the first multi-logic physical processor 704 and continues with the second logical processor, logical processor "X/2+1" 712 and so on. The numbering ends, in this example, with the second logical processor, logical processor "X" 720, on the Nth multi-logic physical processor 708. Thus, all first logical processors are numbered first, followed by all second logical processors and so forth until all logical processors are accounted for on all the multi-logic physical processors. One skilled in the art can also appreciate that if a platform has a mixture of multi-logic, multi-core, and single core processors a similar scheme could be utilized to account for all types of processors.

This type of ordering system allows for the most efficient use of processing resources. This is because applications can assign threads to processors in order without having to know intimate details of processor numbering. This allows each processing thread to be easily sent to a logical processor on a separate physical processor to allow for processing with unshared resources, up to a point. In this example, the point is reached, when the number of threads equals approximately half (utilizing two logical processors per physical processor) the number of available logical processors. At this juncture, the processing threads might have to be sent to a logical processor residing on a physical processor that already has another logical processor processing another thread, possibly slowing its execution due to shared resources.

For example, an application can send a processing thread #1 to logical processor "1" 710 and a thread #2 to logical processor "X/2+1" 712. This means that the first multi-logic physical processor 704 is processing both threads at the same time and utilizing the same resources. In this scenario, greater performance gains would be realized if the application sent thread #1 to logical processor "1" 710 and thread #2 to logical processor "2" 714. This allows the threads to be processed by separate physical processors and no resources are shared between the threads. Thus, although it is important to applications know how many logical processors are available and their relations, logical processors can be ordered to shelter some of the hardware complexities from the applications. Therefore, when the topology API 702 is invoked by an application, relevant topology information is provided to the application, so the application can adjust its processing needs accordingly to optimize performance.

In other instances of the present invention, the topology API contains a processing optimization component (not illustrated) that ensures that processors are ordered to obtain an optimal configuration. This component would interact with hardware components directly or indirectly to assign hardware component usage order to allow for optimum hardware component usage. The optimization component, in other instances, can provide performance enhancing means such as better utilization of multiple mixed types of processors within a platform.

Figure 8:
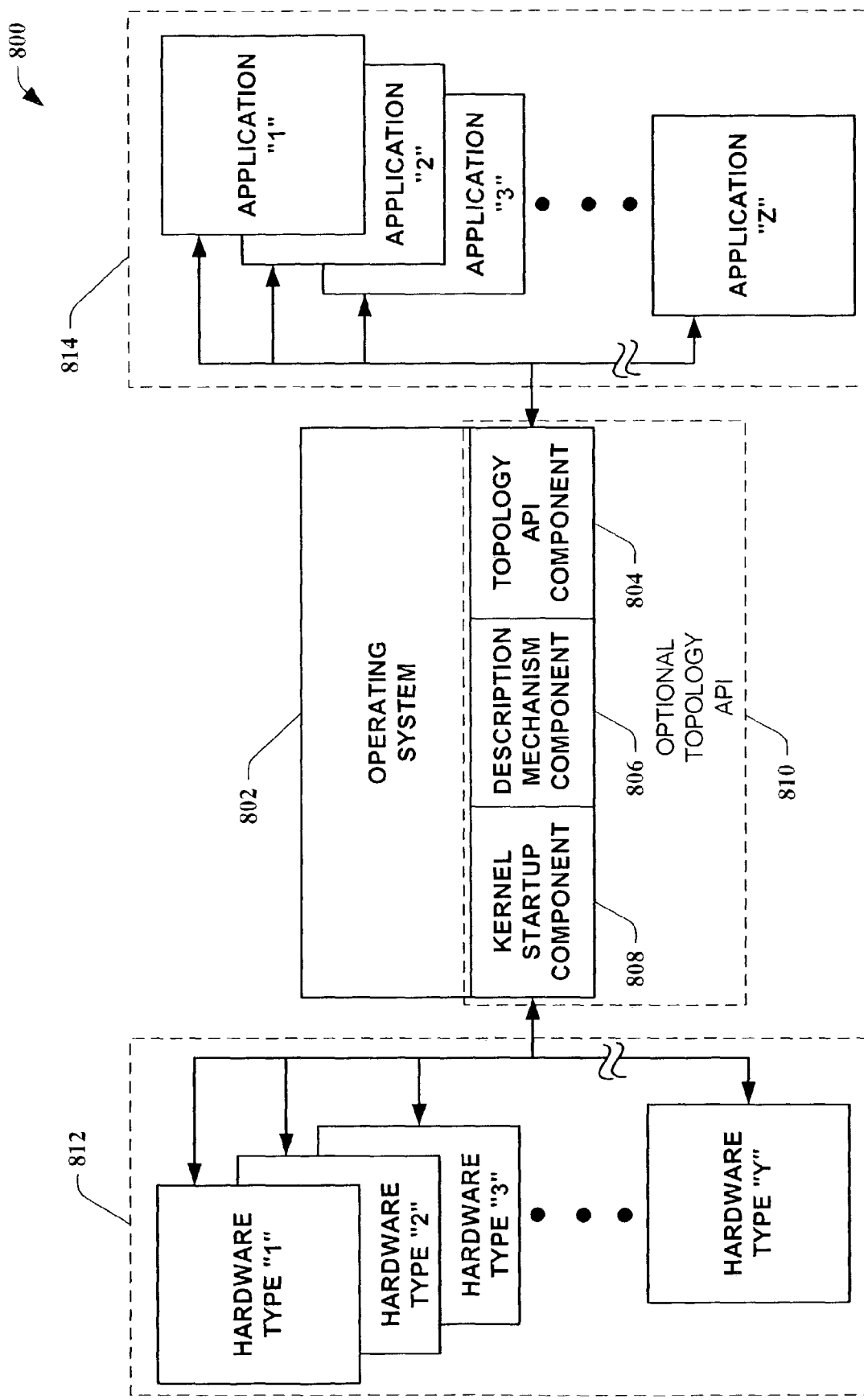
FIG. 8 is another block diagram of a hardware topology system environment in accordance with an aspect of the present invention.

As discussed supra, topology information about a computing platform and its processors is critical to the performance of applications. And, due to all of the complexities of underlying hardware, an efficient and standardized means of providing this information is needed. Turning to FIG. 8, another block diagram of a hardware topology system environment 800 in accordance with an aspect of the present invention is illustrated. This environment 800 is comprised of an operating system 802, a set of executable software programs (applications) 814, and a set of hardware components (platform and processors) 812. The operating system 802 interfaces interactively with the executable software programs 814 and/or the hardware components 812. In this instance of the present invention, the operating system 802 hosts subcomponents comprised of a kernel startup component 808, a description mechanism component 806, and a topology API component 804. In other instances of the present invention, functionality of the kernel startup component 808 and/or the description mechanism component 806 are part of the topology API component 804. Such an instance of the present invention is denoted by a dashed box in FIG. 8 as an optional topology API 810. The topology API 804 interfaces with the set of executable software programs 814 and utilizes a standardized interface to provide topology information, upon request, to applications within the set of executable programs 814 relating to the set of hardware components 812. The kernel startup component 808 collects topology data from the set of hardware components 812 and provides it to the description mechanism component 806. The description mechanism component then generates topology information from the topology data and provides it to the topology API component 804.

Figure 9:
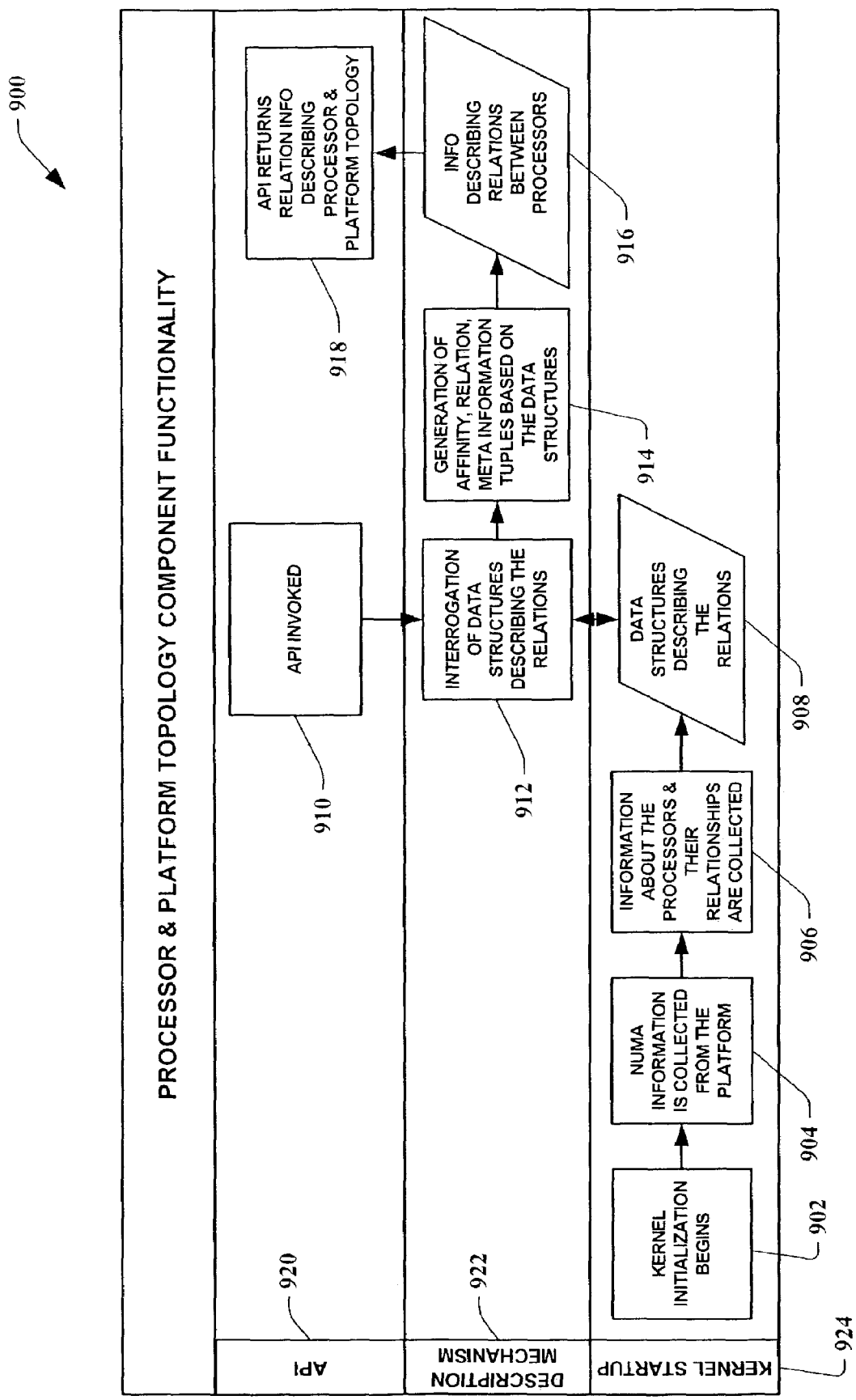
FIG. 9 is a process diagram of a hardware topology system in accordance with an aspect of the present invention.

Another example of the interrelationships and functionality of the aforementioned components is illustrated in FIG. 9 which is a process diagram of a hardware topology system 900 in accordance with an aspect of the present invention. The system 900 is comprised of a kernel startup component 924, a description mechanism component 922, and a topology API component 920. In this instance of the present invention, functionality of the kernel startup component 924 is comprised of initializing the kernel 902, collecting NUMA information from a platform 904, collecting information about processors and/or their relationships 906, and constructing data structures describing the relations 908. Functionality of the description mechanism component 922 is comprised of interrogating the data structures built by the kernel startup component 912, generating affinity mask information, relation value information, and meta data relation information tuples based on the data structures 914, and creating a data structure describing the relations between processors 916.

Functionality of the topology API component 920 is comprised of interfacing with applications and allowing the topology API component 920 to be invoked 910 and providing relation information describing processor and platform topology to applications via a standardized interface 918. In other instances of the present invention, a topology API has some or all of the functionality 902-918 of the kernel startup component 924, the description mechanism 922 and the topology APT component 920. In yet other instances of the present invention a topology API can accept input from applications and utilize this input to alter topology information provided to the applications.

Figure 10:
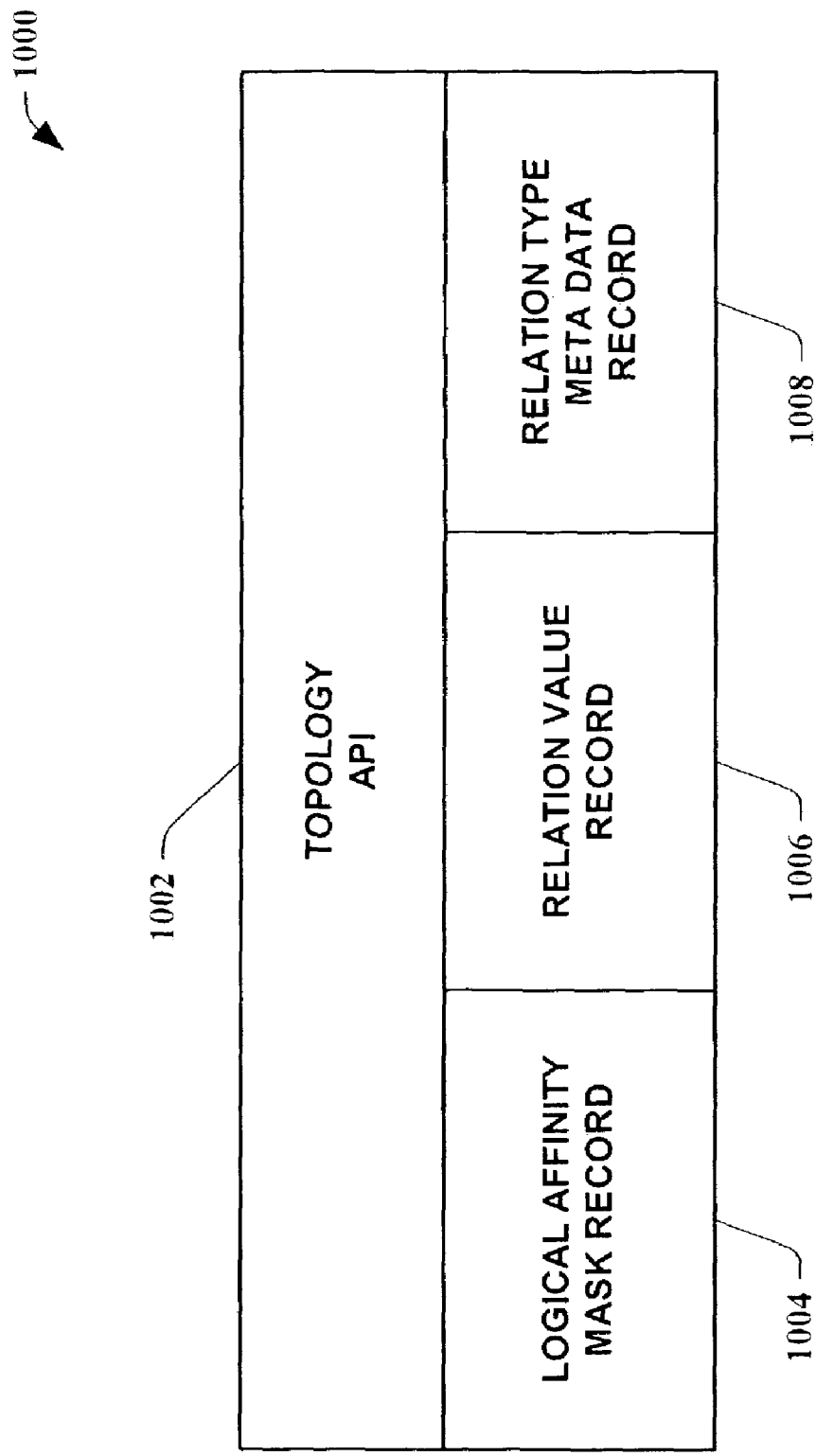
FIG. 10 is a block diagram of a hardware topology component in accordance with an aspect of the present invention.

A typical example of types of topology information is illustrated in FIG. 10. A block diagram of a hardware topology component 1000 in accordance with an aspect of the present invention is shown. The hardware topology component 1000 is comprised of a topology API 1002 containing a logical affinity mask record 1004, a relation value record 1006, and a relation type meta data record 1008. In one instance of the present invention, the logical affinity mask record 1004 utilizes a single bit in the mask to represent each logical processor in a computing system. Thus, the mask record 1004 can be employed to refer to one or more logical processors within the system. The relation value record 1006 indicates a relation type of relationship between the logical processors specified in the affinity mask record 1004. An example of this is symmetric multithreading where logical processors share functional units. The meta data record 1008 includes information specific to the relation type from the relation value record 1006. In this manner, the present invention communicates a variety of information about logical processors and various relationships between logical processors via a descriptive, but expandable means.

The types of topology API information include, but are not limited to, per logical processor cache information, symmetric multithreading relations, multi-core information, shared package cache information, NUMA node membership, platform cache information, and processor bus information. The topology API 1002 allows an operating system to describe various properties and relations in a concise manner without mandating the specification, development, and documentation of a new API for each additional bit of functionality. Additionally, information is provided that allows applications easy access to processor and platform information that the applications can utilize to optimize themselves and/or utilize to implement licensing policies.

An example of a data structure of records provided by a topology API to an application in one instance of the present invention is illustrated in FIG. 11. A table of a hardware topology component data structure 1100 in accordance with an aspect of the present invention is shown. The data structure 1100 is comprised of a logical affinity mask record column 1102, a relation value record column 1104, and a relation type meta data record column 1106. Each bit of an eight bit set (in this instance only) of digits in the logical affinity mask record column 1102 represents a logical processor in a computing system. The relation value record column 1104 is comprised of a cache type 1108, a processor core type 1110, a NUMA type 1112 and a future relation type 1114. The relation type meta data record column 1106 provides meta information about the types of the relation value record column 1104. The future relation type 1114 illustrates how, in one instance of the present invention, a future relation can be incorporated, such as when the number of digits is expanded from eight to nine digits in the logical affinity mask record column 1102.

Figure 12:
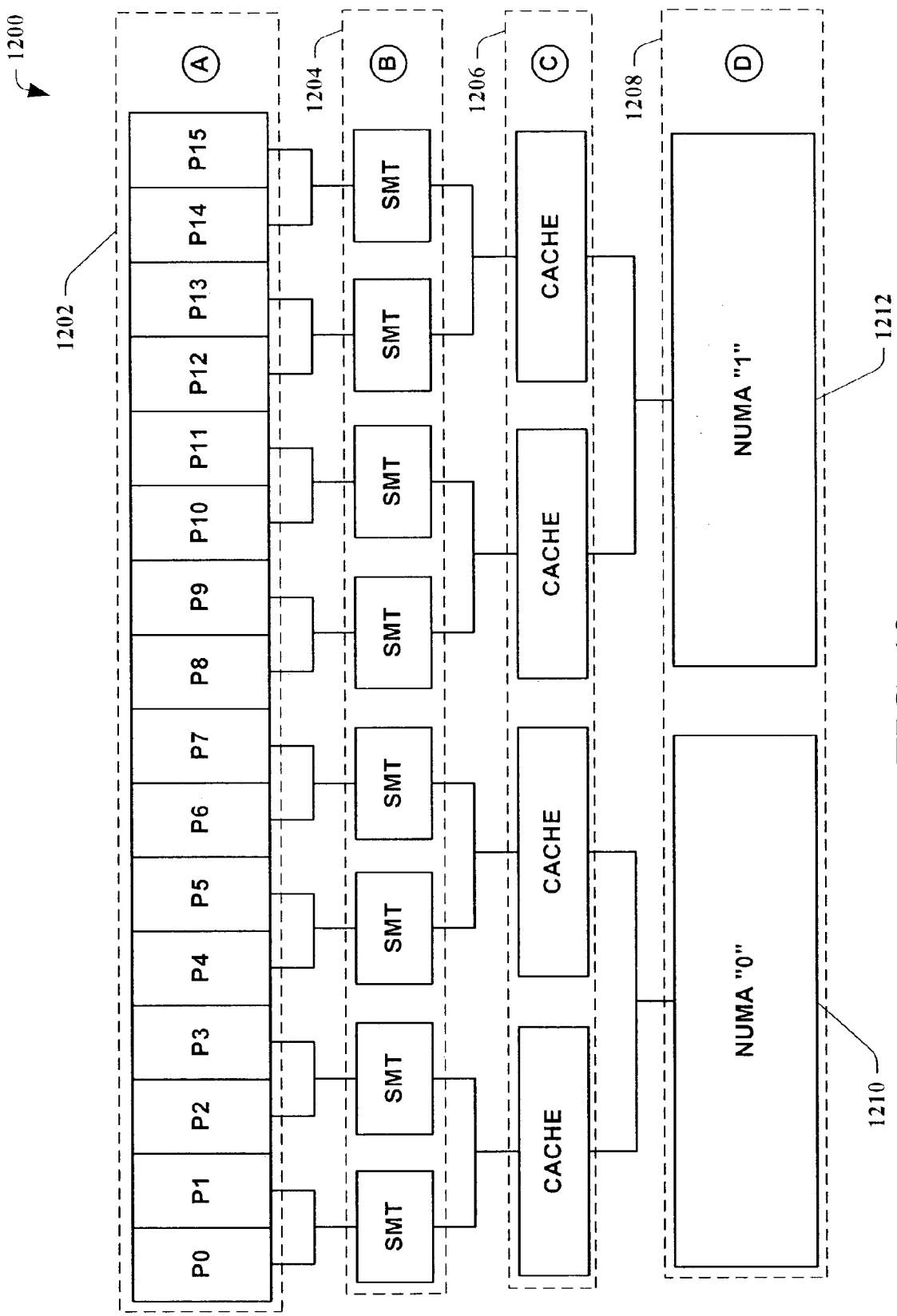
FIG. 12 is a diagram of a hardware hierarchical structure of a computing system in accordance with an aspect of the present invention.

Turning to FIG. 12, a diagram of a hardware hierarchical structure 1200 of a computing system in accordance with an aspect of the present invention is illustrated. The example structure 1200 is comprised of a processor group 1202 (also denoted by "A"), a symmetric multithreading group 1204 (also denoted by "B"), a cache group 1206 (also denoted by "C") and a NUMA node group 1208 (also denoted by "D"). In this particular instance of the present invention, the processor group 1202 is comprised of 16 processors (P0-P15). The structure 1200 indicates that at least two processors are grouped to a single SMT within the symmetric multithreading group 1204. Thus, eight SMTs handle the 16 processors. The structure 1200 also shows that a single cache in the cache group 1206 is shared by at least two SMTs. Thus, the structure 1200 illustrates four caches within the cache group 1206. Each NUMA node of the NUMA node group 1208 handles at least two of the caches from the cache group 1206. The two NUMA nodes 1210 1212 have been designated NUMA "0" 1210 and NUMA "1" 1212. The letter designations within the dotted lines are provided to make easier references between FIG. 12 and FIG. 13 for the various groups.

Figure 13:
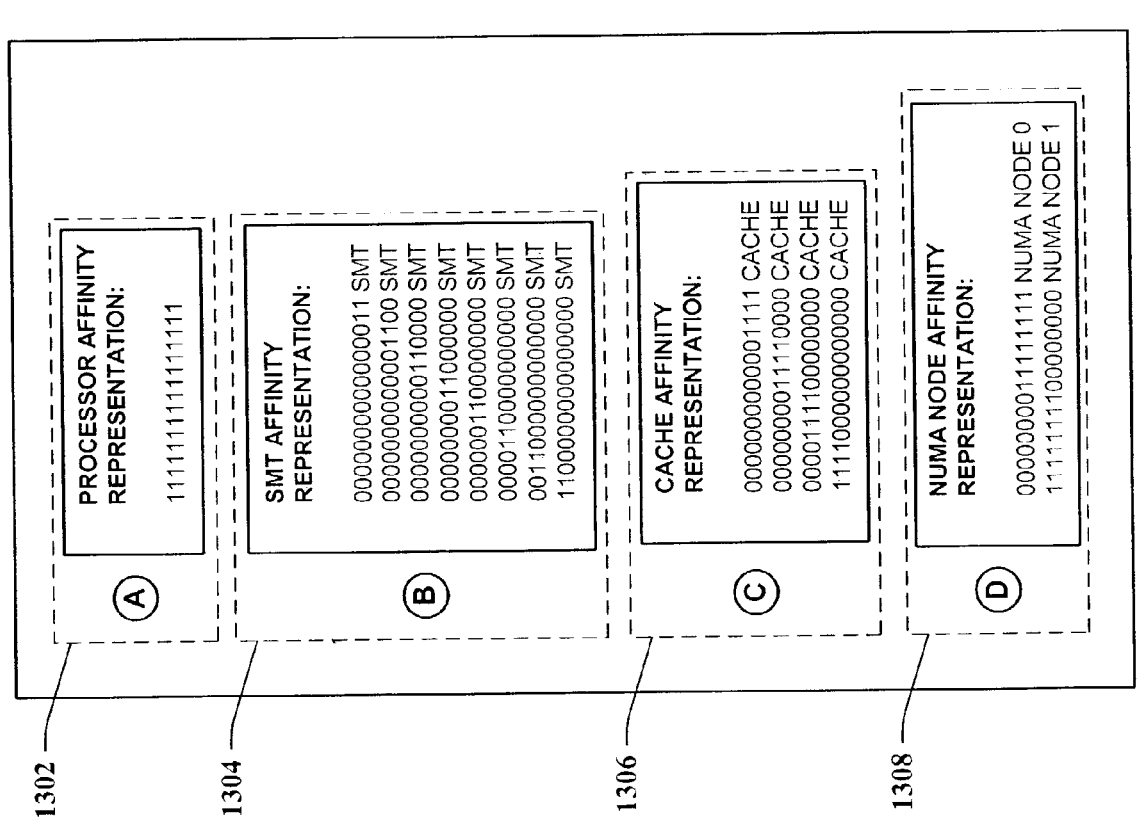
FIG. 13 is another table of a hardware topology component data structure in accordance with an aspect of the present invention.

In FIG. 13, another table of a hardware topology component data structure 1300 in accordance with an aspect of the present invention is depicted. The data structure 1300 is comprised of a processor affinity representation 1302 (also denoted by "A"), an SMT affinity representation 1304 (also denoted by "B"), a cache affinity representation 1306 (also denoted by "C"), and a NUMA node affinity representation 1308 (also denoted by "D"). In this instance of the present invention, the affinity representations 1302-1308 utilize a 16 bit data structure. However, one skilled in the art can appreciate that any size data structure can be utilized by the present invention. The affinity representations in FIG. 13 relate to the hardware hierarchical structure 1200 of FIG. 12. The letter references allow for easy correlation between the figures.

The processor affinity representation 1302 of all "ones" indicates that 16 processors are available, where each "one" represents a single processor as shown in FIG. 12's processor group 1202. The SMT affinity representation 1304 utilizes the 16 bit data structure to indicate which processors of the processor group 1202 are associated with that particular SMT. As shown in FIG. 13's SMT affinity representation 1304, two bits of the 16 bit data structure represent two processors and are located in a specific spot within the 16 bit data structure to indicate which processors are associated with that particular SMT. The cache affinity representation 1306 utilizes a similar structure method to indicate which of the processors of FIG. 12's processor group 1202 are associated with the caches in FIG. 12's cache group 1206. In this example, four bits of the 16 bit structure shown in FIG. 13 are employed to indicate this relationship. The NUMA node affinity representation 1308 utilizes the 16 bit data structure to indicate which processors of the processor group 1202 are associated with a particular NUMA node. In this example, NUMA node "0" 1210 is related to the first eight processors (P0-P7 in FIG. 12) and NUMA node "1" 1212 is related to the last eight processors (P8-P15 in FIG. 12). In this manner, the data structure 1300 allows a topology API to provide information about a computing system's processor and platform topology via a standardized format. The topology API is easily expandable by utilizing the same affinity representation, in this example a 16 bit data structure, and simply adding another relation value type and additional meta data information about that relation value type. Thus, a topology API interface can remain standardized and, at the same time, expandable. This allows applications to easily structure an interface and adapt to any new information without changing the interface.

It should be noted that one skilled in the art can appreciate that a specific bit count for an interface data structure is not required for practicing the present invention. 8-bit, 16-bit, 32-bit, 64-bit, and/or 128-bit data structures and the like are within the scope of the present invention. Additionally, the present invention can be accomplished utilizing a list as well (e.g., a data structure conveying similar information).

Figure 14:
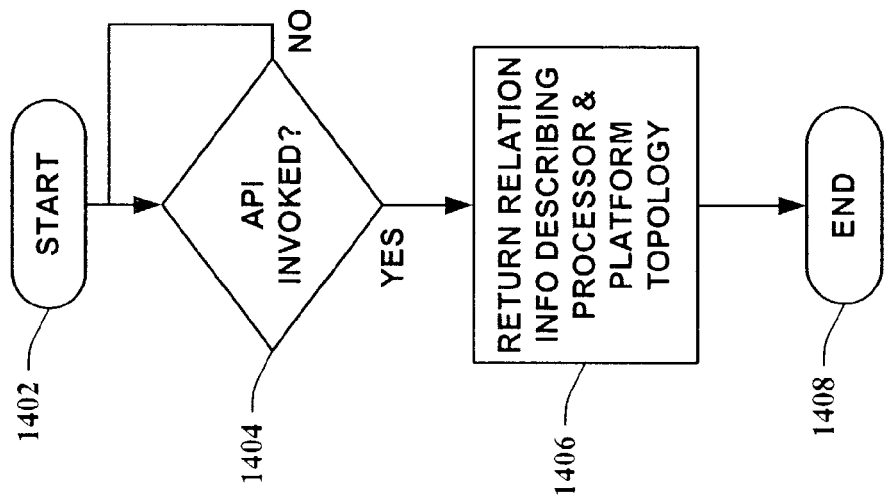
FIG. 14 is a flow diagram of a method of providing hardware topology information in accordance with an aspect of the present invention.
Figure 15:
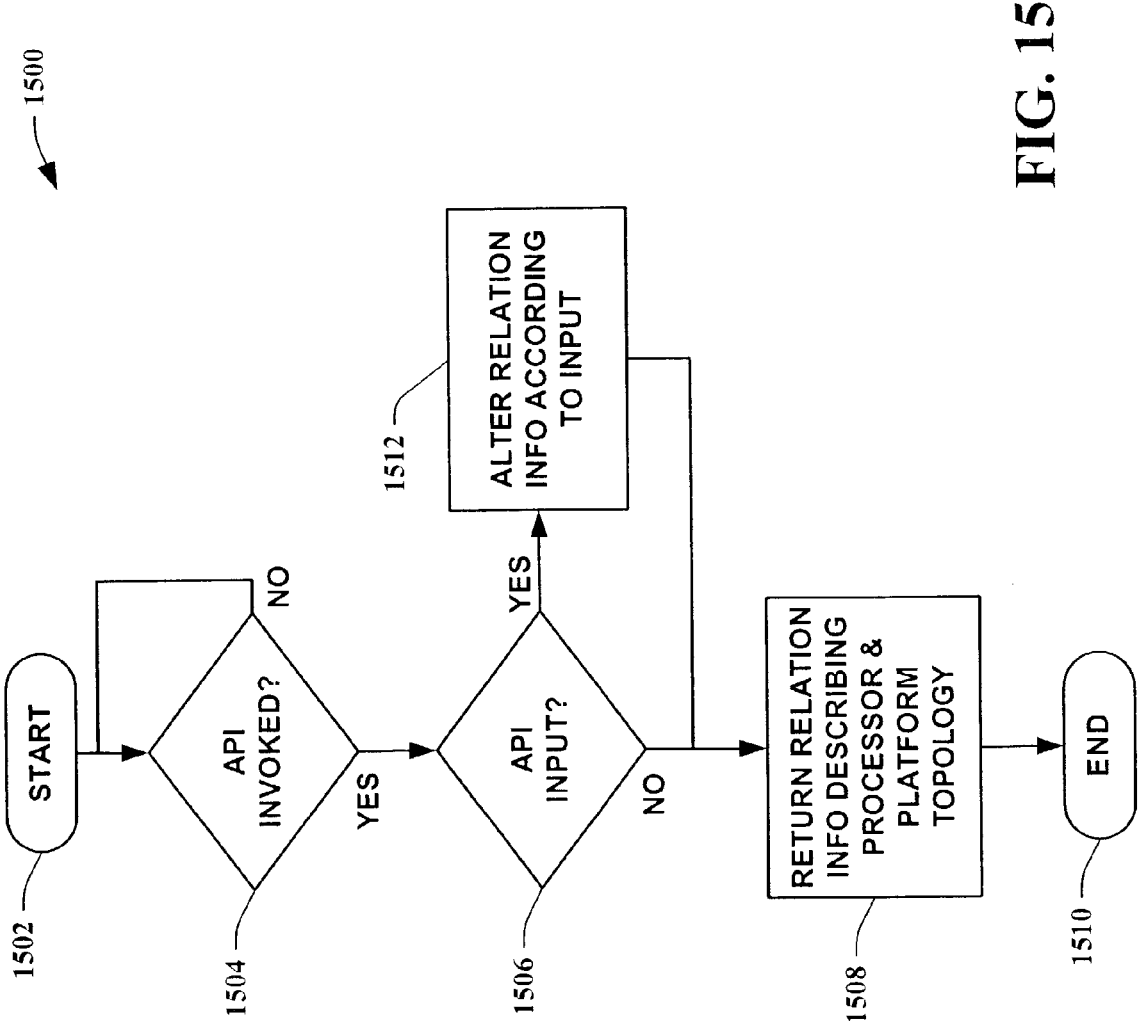
FIG. 15 is another flow diagram of a method of providing hardware topology information in accordance with an aspect of the present invention.
Figure 16:
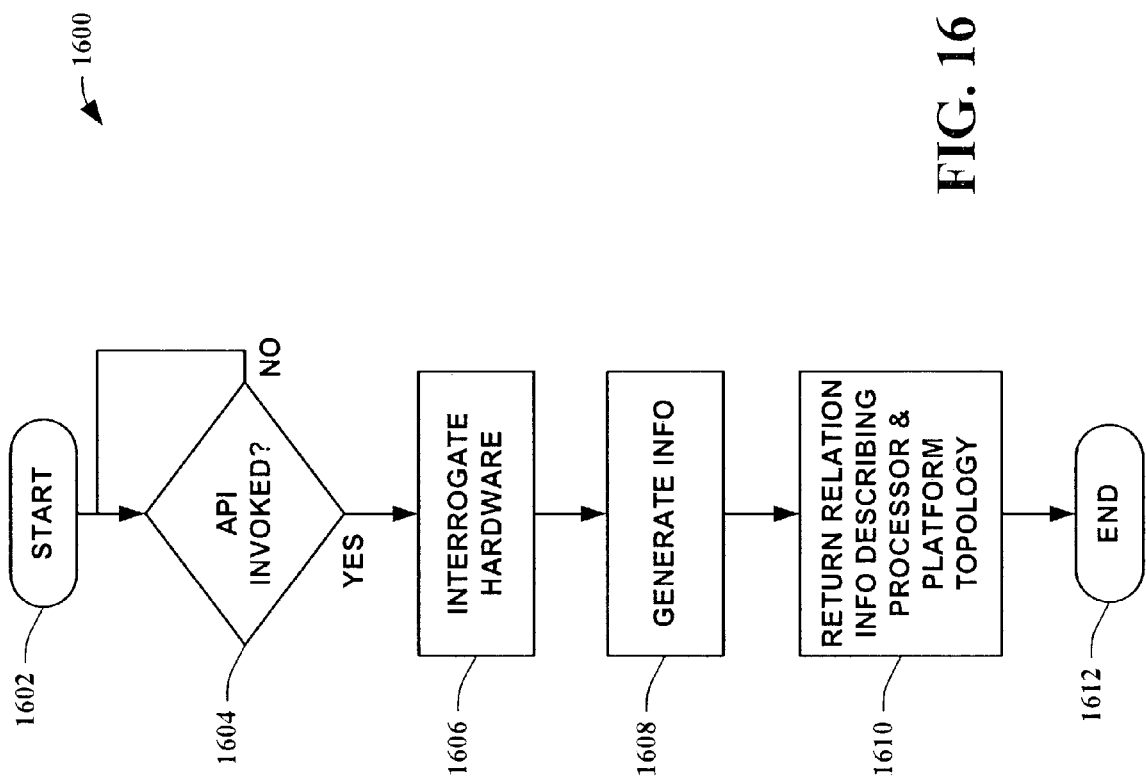
FIG. 16 is yet another flow diagram of a method of providing hardware topology information in accordance with an aspect of the present invention.

In view of the exemplary systems shown and described above, methodologies that may be implemented in accordance with the present invention will be better appreciated with reference to the flow charts of FIGS. 14-16. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

In FIG. 14, a flow diagram of a method 1400 of providing hardware topology information in accordance with an aspect of the present invention is depicted. The method 1400 starts 1402 with making a determination as to whether a topology API is being invoked by an application 1404. If it is not, the determination is repeated until the topology API is invoked. However, if the topology API is invoked, the topology API returns relational information describing processor and platform topology to the application that invoked the topology API 1406, ending the flow 1408. This information includes, but is not limited to, an affinity mask information tuple, a relation value information tuple, and a meta data relation information tuple. The information is provided via a standardized interface to facilitate application optimization and licensing related to hardware platform architecture.

Referring to FIG. 15, another flow diagram of a method 1500 of providing hardware topology information in accordance with an aspect of the present invention is illustrated. The method 1500 starts 1502 with making a determination as to whether a topology API is being invoked by an application 1504. If it is not, the determination is repeated until the topology API is invoked. However, if the topology API is invoked, the topology API makes a determination if the application has provided a topology API input 1506. If no input is given, the topology API returns relational information describing processor and platform topology to the application that invoked the topology API 1508, ending the flow 1510. However, if a topology API input is provided by the application, the topology API alters relation information according to the topology API input 1512. This generally is a means to limit the returned information, but the input could also be utilized to increase the information provided by the topology API. In that instance, the information is not constrained, but "enhanced." and/or added to. Once the input has been accounted for, the topology API returns the altered relational information describing processor and platform topology to the application that invoked the topology API 1508, ending the flow 1510. This information includes, but is not limited to, an affinity mask tuple, a relation value tuple, and a meta data relation tuple. The information is provided via a standardized interface to facilitate application optimization and licensing related to hardware platform architecture.

Turning to FIG. 16, yet another flow diagram of a method 1600 of providing hardware topology information in accordance with an aspect of the present invention is depicted. The method 1600 starts 1602 with making a determination as to whether a topology API is being invoked by an application 1604. If it is not, the determination is repeated until the topology API is invoked. However, if the topology API is invoked, the topology API then interrogates a hardware platform to collect topology data 1606. The topology API then processes the collected topology data and generates information relating to the topology data such as affinity, relation, and meta data about the relations and the like 1608. Once the information has been generated, the topology API returns the relational information describing processor and platform topology to the application that invoked the topology API 1610, ending the flow 1612. Typically a topology API operates within an operating system and provides an interface between the operating system and an application. In this example illustrated in FIG. 16, the topology API does not rely on the operating system to interrogate, collect and generate information desired by an application. Instead, the topology API itself interrogates, collects, generates and also provides the information requested by the application. Thus, the functionality of a topology API can be increased while the interface to the application remains unaltered.

It should also be noted that in other instances of the present invention (not illustrated), topology API functions include generation and reporting of topology information while an operating system provides the interrogation and collection of relevant data functionalities for a hardware platform.

Figure 17:
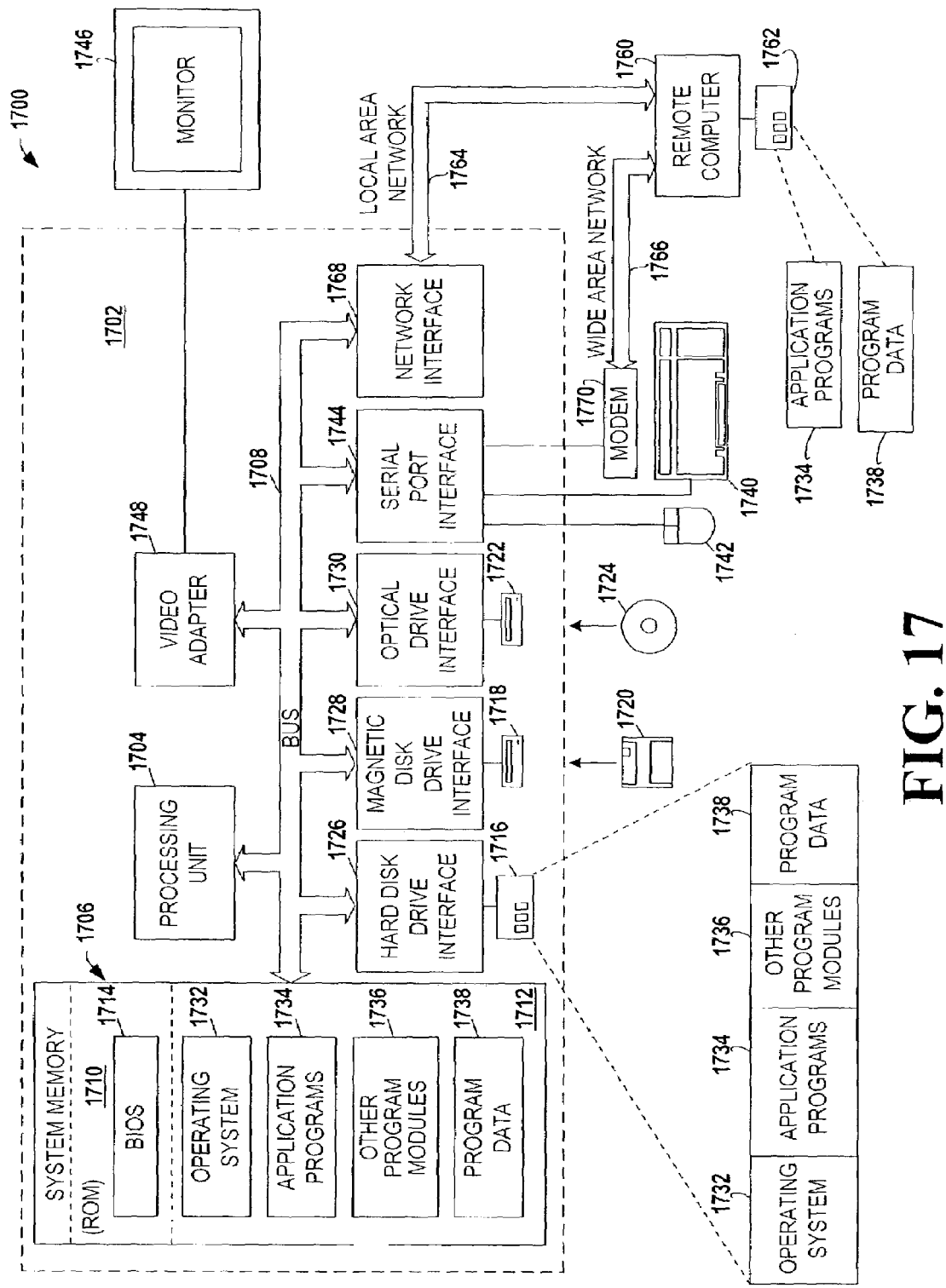
FIG. 17 illustrates an example operating environment in which the present invention can function.

In order to provide additional context for implementing various aspects of the present invention, FIG. 17 and the following discussion is intended to provide a brief, general description of a suitable computing environment 1700 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 17, an exemplary system environment 1700 for implementing the various aspects of the invention includes a conventional computer 1702, including a processing unit 1704, a system memory 1706, and a system bus 1708 that couples various system components, including the system memory, to the processing unit 1704. The processing unit 1704 may be any commercially available or proprietary processor. In addition, the processing unit may be implemented as multi-processor formed of more than one processor, such as may be connected in parallel.

The system bus 1708 may be any of several types of bus structure including a memory bus or memory controller, a peripheral bus, and a local bus using any of a variety of conventional bus architectures such as PCI, VESA, Microchannel, ISA, and EISA, to name a few. The system memory 1706 includes read only memory (ROM) 1710 and random access memory (RAM) 1712. A basic input/output system (BIOS) 1714, containing the basic routines that help to transfer information between elements within the computer 1702, such as during start-up, is stored in ROM 1710.

The computer 1702 also may include, for example, a hard disk drive 1716, a magnetic disk drive 1718, e.g., to read from or write to a removable disk 1720, and an optical disk drive 1722, eg., for reading from or writing to a CD-ROM disk 1724 or other optical media. The hard disk drive 1716, magnetic disk drive 1718, and optical disk drive 1722 are connected to the system bus 1708 by a hard disk drive interface 1726, a magnetic disk drive interface 1728, and an optical drive interlace 1730, respectively. The drives 1716-1722 and their associated computer-readable media provide nonvolatile storage of data, data structures, computer-executable instructions, etc. for the computer 1702. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1700, and further that any such media may contain computer-executable instructions for performing the methods of the present invention.

A number of program modules may be stored in the drives 1716-1722 and RAM 1712, including an operating system 1732, one or more application programs 1734, other program modules 1736, and program data 1738. The operating system 1732 may be any suitable operating system or combination of operating systems. By way of example, the operating system 1732 can include a topology API component that utilizes data in accordance with an aspect of the present invention. Additionally, the operating system 1732 can include input data from hardware for interfacing with the topology API in accordance with an aspect of the present invention.

A user can enter commands and information into the computer 1702 through one or more user input devices, such as a keyboard 1740 and a pointing device (e.g., a mouse 1742). Other input devices (not shown) may include a microphone, a joystick, a game pad, a satellite dish, wireless remote, a scanner, or the like. These and other input devices are often connected to the processing unit 1704 through a serial port interface 1744 that is coupled to the system bus 1708, but may be connected by other interfaces, such as a parallel port, a game port or a universal serial bus (USB). A monitor 1746 or other type of display device is also connected to the system bus 1708 via an interface, such as a video adapter 1748. In addition to the monitor 1746, the computer 1702 may include other peripheral output devices (not shown), such as speakers, printers, etc.

It is to be appreciated that the computer 1702 can operate in a networked environment using logical connections to one or more remote computers 1760. The remote computer 1760 may be a workstation, a server computer, a router, a peer device or other common network node, and typically includes many or all of the elements described relative to the computer 1702, although, for purposes of brevity, only a memory storage device 1762 is illustrated in FIG. 17. The logical connections depicted in FIG. 17 can include a local area network (LAN) 1764 and a wide area network (WAN) 1766. Such networking environments are commonplace in offices, enterprise-wide computer networks, intranets and the Internet.

When used in a LAN networking environment, for example, the computer 1702 is connected to the local network 1764 through a network interface or adapter 1768. When used in a WAN networking environment, the computer 1702 typically includes a modem (e.g., telephone, DSL, cable, etc.) 1770, or is connected to a communications server on the LAN, or has other means for establishing communications over the WAN 1766, such as the Internet. The modem 1770, which can be internal or external relative to the computer 1702, is connected to the system bus 1708 via the serial port interface 1744. In a networked environment, program modules (including application programs 1734) and/or program data 1738 can be stored in the remote memory storage device 1762. It will be appreciated that the network connections shown are exemplary and other means (e.g., wired or wireless) of establishing a communications link between the computers 1702 and 1760 can be used when carrying out an aspect of the present invention.

In accordance with the practices of persons skilled in the art of computer programming, the present invention has been described with reference to acts and symbolic representations of operations that are performed by a computer, such as the computer 1702 or remote computer 1760, unless otherwise indicated. Such acts and operations are sometimes referred to as being computer-executed. It will be appreciated that the acts and symbolically represented operations include the manipulation by the processing unit 1704 of electrical signals representing data bits which causes a resulting transformation or reduction of the electrical signal representation, and the maintenance of data bits at memory locations in the memory system (including the system memory 1706, hard drive 1716, floppy disks 1720, CD-ROM 1724, and remote memory 1762) to thereby reconfigure or otherwise alter the computer system's operation, as well as other processing of signals. The memory locations where such data bits are maintained are physical locations that have particular electrical, magnetic, or optical properties corresponding to the data bits.

Figure 18:
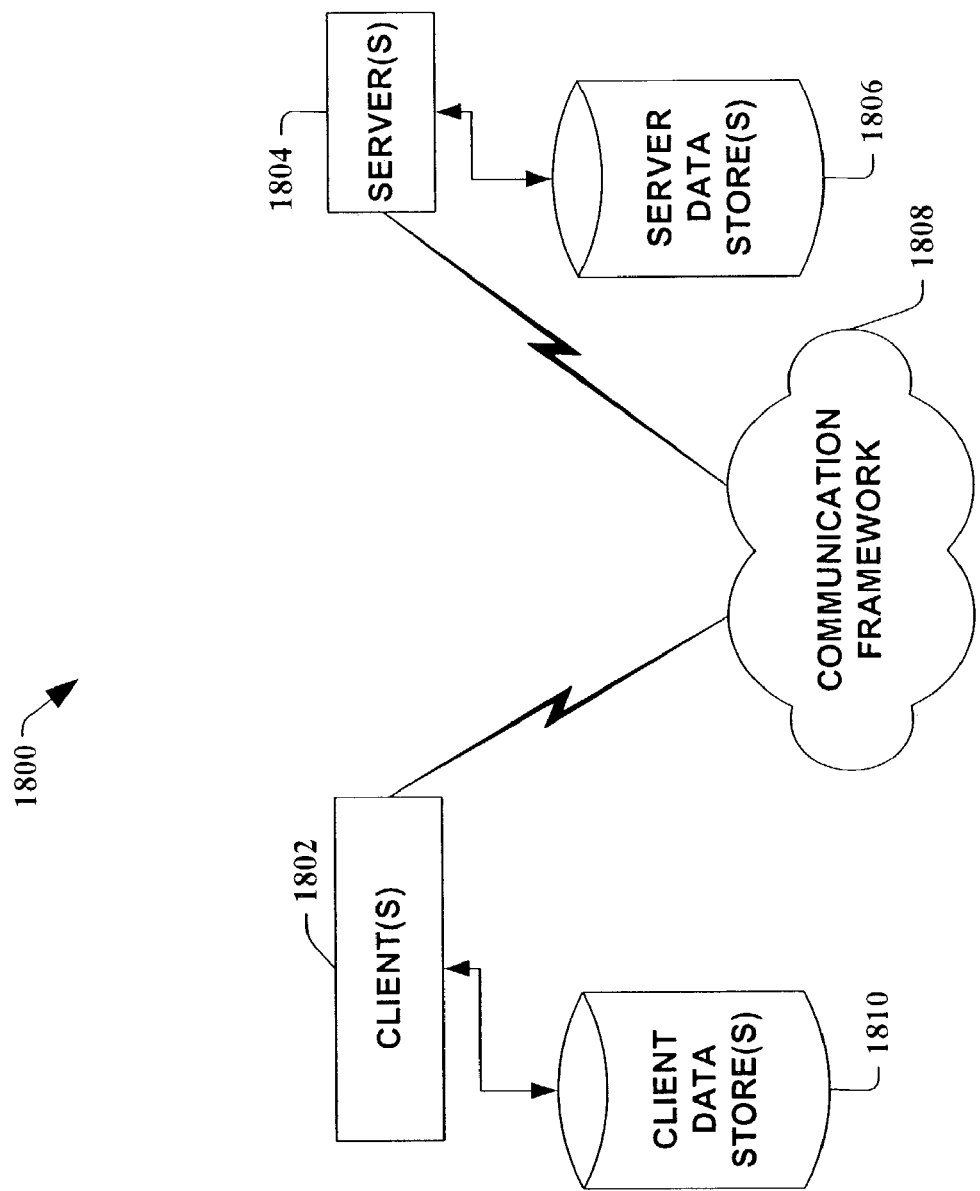
FIG. 18 illustrates another example operating environment in which the present invention can function.

FIG. 18 is another block diagram of a sample computing environment 1800 with which the present invention can interact. The system 1800 further illustrates a system that includes one or more client(s) 1802. The client(s) 1802 can be hardware and/or software (e.g., threads, processes, computing devices). The system 1800 also includes one or more server(s) 1804. The server(s) 1804 can also be hardware and/or software (e.g., threads, processes, computing devices). The servers 1804 can house threads to perform transformations by employing the present invention, for example. One possible communication between a client 1802 and a server 1804 may be in the form of a data packet adapted to be transmitted between two or more computer processes. The system 1800 includes a communication framework 1808 that can be employed to facilitate communications between the client(s) 1802 and the server(s) 1804. The client(s) 1802 are operably connected to one or more client data store(s) 1810 that can be employed to store information local to the client(s) 1802. Similarly, the server(s) 1804 are operably connected to one or more server data store(s) 1806 that can be employed to store information local to the servers 1804.

In one instance of the present invention, a data packet is transmitted between two or more computer components that facilitates describing processor and platform properties and relations thereof with the data packet comprised, at least in part, of hardware topology information, based, in part, on data from a topology API.

In another instance of the present invention, a computer readable medium storing computer executable components of a system for facilitating describing processor and platform properties and relations thereof that is comprised of a topology API that provides a standardized interface for executable programs and provides information about topology data relating to at least one hierarchical structure of hardware associated with a computing system via the standardized interface.

In yet another instance of the present invention, a computer-readable medium having stored thereon a data structure comprised of a first data field containing at least one affinity mask record relating to data about a hardware topology, a second data field containing at least one relation value record derived from relations of the hardware topology, and a third data field containing at least one meta data record about the relation value record of the hardware topology.

It is to be appreciated that the apparatus, systems and/or methods of the present invention can be utilized in a hardware hierarchical structure analysis scheme for facilitating computer components and non-computer related components alike. Further, those skilled in the art will recognize that the apparatus, systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hardware topology component, that generates data relating to hardware topology, the component stored in a computer memory and comprising:
   a topology API (Application Programming Interface) that provides a standardized interface to a plurality of executable programs, and provides information about topology data relating to at least one hierarchical structure of hardware comprising at least one multi-logic processor comprised of a plurality of logical processing units associated with a computing system via the standardized interface to the executable programs;
   a processing optimization component that assigns hardware component usage order for the at least one multi-logic processor allowing for optimal usage of the hardware by the executable programs via assigning threads from at least one of the executable programs based on the information provided,
   wherein if the at least one multi-logic processor is a single core processor, execution of threads from the at least one of the executable programs are timed such that a thread is run when no other threads are utilizing resources shared by the logical processing units and if the at least one multi-logic processor is a multi-core processor, assigning the threads to one or more unshared resources of the at least one multi-logic processor prior to assigning the threads to resources shared by the logical processing units on the multi-core processor.

2. The hardware topology component of claim 1, the topology API comprising an expandable API that allows additional information to be provided to the executable programs without altering the standardized interface.

3. The hardware topology component of claim 1, the hardware topology comprising one or more of, at least one resource utilized by a processor, or at least one platform relating to a processor.

4. The hardware topology component of claim 1, the information comprising at least one of an affinity information tuple, a relational information tuple, or a meta data information tuple, derived, at least in part, from the topology data.

5. The hardware topology component of claim 4, the affinity information tuple comprising at least one affinity mask.

6. The hardware topology component of claim 5, the affinity mask comprising at least one 16 bit mask, at least one bit of the mask representing at least one logical processor.

7. The hardware topology component of claim 5, the affinity mask including at least one of an affinity mask relating to at least one processor core, an affinity mask relating to at least one SMT (symmetric multi-threading), an affinity mask relating to at least one cache, an affinity mask relating to at least one multi-core processor, or an affinity mask relating to at least one NUMA (non-uniform memory access) node.

8. The hardware topology component of claim 1, the information about the topology data utilized, at least in part, to maximize performance of at least one executable program.

9. The hardware topology component of claim 1, the information about the topology data utilized, at least in part, to facilitate licensing within at least one executable program.

10. The hardware topology component of claim 1, the topology data comprising at least one of cache data, logical processor data, core processor data, node data, bus access data, or shared resources data.

11. The hardware topology component of claim 10, the node data comprising NUMA information.

12. The hardware topology component of claim 10, the core processor data comprising a number of core processing units on a processor.

13. The hardware topology component of claim 10, the cache data comprising cache access relational information.

14. The hardware topology component of claim 10, the logical processor data comprising a number of the logical processing units on a processor.

15. The hardware topology component of claim 1, the topology API operative within an operating system.

16. The hardware topology component of claim 1, the topology API operatively coupled to a kernel component within an operating system.

17. The hardware topology component of claim 1, the topology API operatively coupled to a description mechanism component within an operating system.

18. The hardware topology component of claim 1, further comprising a call input for invoking the topology API.

19. The hardware topology component of claim 1, further comprising: a kernel startup component that collects the topology data relating to at least one hierarchical structure of hardware associated with the computing system.

20. The hardware topology component of claim 1, further comprising: a description mechanism component that interrogates the topology data and generates tuples based, at least in part, on the topology data.

21. The hardware topology component of claim 1, the API identifying one or more of a subset of the at least one processor that shares functional units, a subset of the processor is a member of one or more of a common NUMA node, at least one processor cache, at least one multi-core processor relationship, at least one multi-core shared processor cache, or at least one platform cache.

22. A device employing the system of claim 1 comprising at least one from a group consisting of a computer, a server, and a handheld electronic device.

23. The hardware topology component of claim 1 wherein the information about topology data relates to one or more of number of logical processing units on the multi-logic processor, or relationship information of the logical processing units to the physical multi-logic processor and shared resources.

24. A computer-implemented method for providing hardware topology information, comprising:
providing an interface of an operating system comprising a topology API (Application Programming Interface) for interacting with an executable program;
invoking the interface by the executable program;
returning relation information describing hardware topology data associated with at least one multi-logic processor comprising a plurality of logical processing units, and at least one resource utilized by the at least one multi-logic processor, or at least one platform relating to the at least one multi-logic processor to the executable program via the interface; and
assigning hardware component usage order to allow for optimum hardware component usage of the at least one multi-logic processor by the executable program such that if the at least one multi-logic processor is a single core processor, execution of threads from the executable program are timed such that a thread is run when no other threads are utilizing resources shared by the logical processing units and if the at least one multi-logic processor is a multi-core processor, assigning the threads to one or more unshared resources of the at least one multi-logic processor prior to assigning the threads to resources shared by the logical processing units on the multi-core processor.

25. The method of claim 24, the relation information comprising one or more of an affinity information tuple, a relational information tuple, or a meta data information tuple, derived, at least in part, from the hardware topology data.

26. The method of claim 24, further comprising:
inputting parameters from the executable program to the interface to obtain a desired response from the interface; and
altering the relation information from the interface based on the parameters to provide the desired response to the executable program.

27. The method of claim 24, further comprising:
interrogating hardware to obtain topology data about the hardware; and
generating topology information based, at least in part, on the topology data.

28. The method of claim 27, the topology information comprising one or more of an affinity information tuple, a relational information tuple, or a meta data information tuple, derived, at least in part, from the topology data.

29. A device employing the method of claim 24 comprising at least one from a group consisting of a computer, a server, and a handheld electronic device.

30. A computer readable storage medium storing computer executable components of a system for facilitating describing processor and platform properties and relations thereof, comprising:
a topology API (Application Programming Interface) that provides a standardized interface for one or more executable programs and provides information about topology data relating to at least one hierarchical structure of hardware comprising of at least one multi-logic processor comprising a plurality of logical processing units and at least one resource utilized by the at least one multi-logic processor, or at least one platform relating to the at least one multi-logic associated with a computing system via the standardized interface to the one or more executable programs; and
a processing optimization component that assigns hardware component usage order for the at least one multi-logic processor allowing for optimal usage of the hardware by the one or more executable programs via assigning threads from the one or more executable programs based on the information provided,
wherein if the at least one multi-logic processor is a single core processor, execution of threads from the at least one of the one or more executable programs are timed such that a thread is run when no other threads are utilizing resources shared by the logical processing units and if the at least one multi-logic processor is a multi-core processor, assigning the threads to one or more unshared resources of the at least one multi-logic processor prior to assigning the threads to resources shared by the logical processing units on the multi-core processor.

* * * * *